US011952072B2

(12) United States Patent
Bryant

(10) Patent No.: US 11,952,072 B2
(45) Date of Patent: Apr. 9, 2024

(54) SELF-STABILIZING VEHICLE

(71) Applicant: Bryant Engineering & Development, LLC, Bellevue, WA (US)

(72) Inventor: Robert H. Bryant, Bellevue, WA (US)

(73) Assignee: Bryant Engineering & Development, LLC, Bellevue, WA (US)

( * ) Notice: Subject to any disclaimer, the term of this patent is extended or adjusted under 35 U.S.C. 154(b) by 0 days.

(21) Appl. No.: 17/860,138

(22) Filed: Jul. 8, 2022

(65) Prior Publication Data

US 2022/0340228 A1    Oct. 27, 2022

Related U.S. Application Data

(63) Continuation-in-part of application No. 17/114,667, filed on Dec. 8, 2020, now abandoned.

(51) Int. Cl.
*B62K 11/00* (2006.01)
*B62J 45/412* (2020.01)

(52) U.S. Cl.
CPC ............ *B62K 11/00* (2013.01); *B62J 45/412* (2020.02)

(58) Field of Classification Search
CPC ........ B62D 37/04; B62D 37/00; B62D 37/06; B62D 61/02; B60G 17/016; B60K 11/007; B60K 11/00; B62K 21/00; B62J 45/412

(Continued)

(56) References Cited

U.S. PATENT DOCUMENTS 2,976,753 A * 3/1961 Fowler .................... B30B 15/32
83/156
4,903,790 A * 2/1990 Horiike .................. B62K 25/24
280/282

(Continued)

FOREIGN PATENT DOCUMENTS

CA       2976753      4/2019
CN      206501952     9/2017

(Continued)

OTHER PUBLICATIONS

Global Self-balancing Motorcycle Market 2017-2021; Date of Publication: https://www.technavio.com/report/global-self-balancing-motorcycle-market—Date of Publication: Oct. 2017.

(Continued)

*Primary Examiner* — James A Shriver, II
*Assistant Examiner* — Hilary L Johns
(74) *Attorney, Agent, or Firm* — Cozen O'Connor

(57) ABSTRACT

A system and method of stabilizing a vehicle are disclosed. In accordance with one aspect, a self-stabilizing vehicle having an articulated frame may generally comprise: a base frame portion coupled to one or more wheels; an operator frame portion to support an operator of the vehicle; a hinge assembly operably coupling the base frame portion and the operator frame portion; and a control unit to drive the hinge assembly causing the operator frame portion to rotate (relative to the base frame portion) about one or more hinge axes as a function of inertial data and speed data, and optionally steering control input signals. In some two-wheeled applications, both wheels are steerable; additionally, both wheels may be driven. Alternative vehicles are disclosed having one wheel and three wheels.

18 Claims, 11 Drawing Sheets

(58) Field of Classification Search
USPC .................................................. 180/214, 334
See application file for complete search history.

(56) References Cited

U.S. PATENT DOCUMENTS

| | | | | |
|---|---|---|---|---|
| 7,350,787 | B2* | 4/2008 | Voss | B62K 21/02 |
| | | | | 280/281.1 |
| 9,428,236 | B2* | 8/2016 | Goss | B62K 11/00 |
| 10,864,959 | B2* | 12/2020 | Abke | B62K 11/00 |
| 11,413,925 | B2* | 8/2022 | Breazlan | B60G 21/026 |
| 2007/0182123 | A1* | 8/2007 | Bryant | B62K 3/002 |
| | | | | 280/271 |
| 2011/0209929 | A1* | 9/2011 | Heinzmann | B60L 7/26 |
| | | | | 180/6.2 |
| 2015/0123389 | A1* | 5/2015 | Goss | B62K 11/00 |
| | | | | 280/755 |
| 2017/0043831 | A1* | 2/2017 | Zhu | B62H 7/00 |
| 2019/0118895 | A1* | 4/2019 | Abke | B60B 19/04 |
| 2020/0023913 | A1* | 1/2020 | Hon | B60G 13/10 |
| 2020/0086911 | A1* | 3/2020 | Stahl | B62D 5/005 |
| 2020/0384824 | A1* | 12/2020 | Breazlan | B60G 21/06 |

FOREIGN PATENT DOCUMENTS

| | | |
|---|---|---|
| CN | 108594637 | 9/2018 |
| CN | 109298710 | 2/2019 |
| CN | 208802068 | 4/2019 |
| CN | 109941372 | 6/2019 |
| CN | 210101920 | 2/2020 |
| CN | 110888444 | 3/2020 |
| DE | 102011084754 | 4/2013 |
| DE | 102018200760 | 7/2019 |
| KR | 101651791 | 8/2016 |

OTHER PUBLICATIONS

International Search Report and Written Opinion dated Apr. 18, 2022.

* cited by examiner

SELF-STABILIZING VEHICLE

CROSS-REFERENCE TO RELATED APPLICATION

This application is a continuation-in-part of, and claims priority to, co-pending U.S. patent application Ser. No. 17/114,667, filed Dec. 8, 2020, the disclosure of which is hereby incorporated herein by reference in its entirety.

FIELD OF THE DISCLOSURE

Aspects of the disclosed subject matter relate generally to two-wheeled or inline vehicles, and more particularly to a system and method enabling self-stabilization of a vehicle comprising an articulated frame and an automatically driven hinge assembly; in some instances, the vehicle may have two steerable wheels.

BACKGROUND

Typically, two-wheeled vehicles or "inline" vehicles (i.e., vehicles in which the wheels are in alignment with a longitudinal axis of the vehicle) are inherently unstable at low speeds. Some designers and manufacturers have attempted to address this instability problem by installing one or more gyroscopes or flywheels, which can be controlled to generate a torque. In theory, at least, a two-wheeled vehicle can attain and maintain balance via gyroscopic forces associated with rotational inertia of a rapidly rotating, massive flywheel. In practice, however, such gyro-based systems suffer from several difficulties or draw backs, for example: cost; design and operating complexity; negative impact on reliability; and safety concerns. In particular, there is an unavoidable complexity associated with integration of a gyro-based system as vehicle velocity increases. As a gyro's effectiveness relies upon angular momentum of a massive flywheel (and because the rotational velocity of the flywheel cannot be changed instantaneously), the gyro must be operating continually, even as a vehicle accelerates from zero to a higher speed at which the gyro-based system is no longer needed for stability. This continuous operation wastes energy and, coupled with angular momentum of the vehicle's own wheels, can actually induce instabilities that the system seeks to minimize. Additionally, failure of the gyro-based system, or something less than optimal operation, may render the vehicle entirely inoperable or, if being operated at high speed, highly dangerous.

Therefore, there is a need for an improved system and method of stabilizing a two-wheeled or inline vehicle that is readily adjustable or selectively activated as a function of, or otherwise in cooperation with, vehicle speed.

SUMMARY OF THE DISCLOSURE

The following presents a simplified summary of the disclosure in order to provide a basic understanding of some aspects of various embodiments disclosed herein. This summary is not an extensive overview of the disclosure. It is intended neither to identify key or critical elements of the disclosed embodiments nor to delineate the scope of those embodiments. Its sole purpose is to present some concepts of the invention in a simplified form as a prelude to the more detailed description that is presented later.

The present disclosure describes a system and method employing an articulated frame to enable self-stabilization of a two-wheeled vehicle or an inline vehicle (i.e., a vehicle having wheels that are aligned along a central longitudinal vehicle axis, e.g., in the direction of travel). In some implementations, a base frame portion supports an operator frame portion via a hinge assembly; during use of the vehicle, a control unit may be operative to drive the hinge assembly, causing the operator frame portion to rotate about a hinge axis as a function of, or otherwise responsive to, real-time operational parameters of the vehicle. In specific use cases, the hinge axis may be horizontal, for instance, and substantially parallel to a longitudinal axis of the vehicle, or it may be vertical, or substantially normal to the longitudinal axis of the vehicle.

In either case, the hinge assembly may drive the operator frame portion to a position such that the mass of the operator frame portion (including the mass of the operator, for instance) substantially balances the mass of the base frame portion—i.e., the center of mass of the vehicle components (including the operator) remains in a position such that the vehicle does not topple over, even at low speeds.

In some implementations, two wheels may be steerable, such that the turning radius of the vehicle is greatly reduced as compared to a version in which only one wheel (such as either a front wheel or a back wheel) is steerable. In some circumstances in which both of the wheels of a two-wheeled vehicle are steerable and powered, the vehicle may operate in a variety of ways that conventional two-wheeled vehicles cannot. For example, diagonal, and even sideways, motion (e.g., as compared to a longitudinal axis of the vehicle) is possible, as is zero-radius turning (e.g., rotation about a vertical axis). In cooperation with the hinge assembly noted above, for instance, such maneuvering may occur at very low speeds, or in some instance, when the vehicle is stationary, or nearly stationary.

In accordance with one aspect of the disclosed subject matter, for example, a self-stabilizing vehicle may generally comprise: a front wheel and a rear wheel substantially aligned along a longitudinal axis; a base frame portion coupled to the front wheel and to the rear wheel; an operator frame portion to support an operator of the vehicle; a hinge assembly operably coupling the base frame portion and the operator frame portion; and a control unit receiving, from an inertial sensor, inertial data related to deviation of the base frame portion from a vertical plane through the longitudinal axis, receiving, from a speed sensor, instantaneous speed data related to a rate of travel of the vehicle, and receiving, from a steering control input mechanism, a steering control input signal related to an intended direction of travel; wherein the control unit is operative to drive the hinge assembly causing the operator frame portion to rotate about a hinge axis as a function of the inertial data and the instantaneous speed data; and wherein the control unit is further operative to cause each of the front wheel and the back wheel to deflect at a respective angle from the longitudinal axis as a function of the steering control input.

Vehicles are disclosed wherein the hinge axis is substantially parallel to the longitudinal axis, wherein the hinge axis is substantially normal to the longitudinal axis, and wherein there are two or three independent hinge axes.

Implementations wherein the hinge assembly includes an actuator controlling an angle of a hinge are disclosed, as are implementations wherein the control unit computes an angle through which to rotate the operator frame portion and a torque to apply to the hinge, and wherein the control unit computes an angle through which to rotate the operator frame portion and a torque to apply to the hinge as a function of the steering control input.

In some situations, the control unit causes each of the front wheel and the back wheel to deflect from the longitudinal axis in opposite directions; additionally or alternatively, the control unit causes each of the front wheel and the back wheel to deflect from the longitudinal axis in a same direction. In one example, the control unit causes each of the front wheel and the back wheel to deflect to a position that is substantially perpendicular to the longitudinal axis.

As set forth below, in at least one implementation, the control unit is further operative to cause each of the front wheel and the back wheel to deflect at a respective angle from the longitudinal axis additionally as a function of the inertial data and the instantaneous speed data.

In accordance with another aspect of the disclosed subject matter, a method of stabilizing a vehicle may generally comprise: coupling a base frame portion of the vehicle to a front wheel and to a rear wheel, wherein the front wheel and the rear wheel are substantially aligned along a longitudinal axis; coupling the base frame portion to an operator frame portion with a hinge having a hinge axis, wherein the operator frame portion is to support an operator of the vehicle and is selectively rotatable relative to the base frame portion about the hinge axis; receiving, from an inertial sensor, inertial data related to deviation of the base frame portion from a vertical plane through the longitudinal axis and receiving, from a speed sensor, instantaneous speed data related to a rate of travel of the vehicle; receiving, from a steering control input mechanism, a steering control input signal related to an intended direction of travel; responsive to the inertial data and the instantaneous speed data, selectively driving the hinge to cause the operator frame portion to rotate about the hinge axis; and, responsive to the steering control input signal, selectively causing each of the front wheel and the back wheel to deflect at a respective angle from the longitudinal axis.

Methods are disclosed wherein the receiving inertial data comprises utilizing a control unit to receive data from a gyroscope, wherein the receiving instantaneous speed data comprises utilizing a control unit to receive data from a speedometer, and wherein the receiving the steering control input signal comprises utilizing a control unit to receive a signal from one of a steering wheel, a handle controller, or a joystick.

In some implementations, a method may further comprise utilizing a control unit to compute, using the inertial data and the instantaneous speed data, an angle through which to rotate the operator frame portion and a torque to apply to the hinge; in some situations, the selectively driving the hinge further comprises computing the angle and the torque as a function of the steering control input signal.

Methods are disclosed wherein the selectively causing further comprises utilizing the control unit to compute the respective angle for each of the front wheel and the back wheel as a function of the steering control input signal, the inertial data, and the instantaneous speed data; the selectively causing may further comprise causing each of the front wheel and the back wheel to deflect from the longitudinal axis in opposite directions, or causing each of the front wheel and the back wheel to deflect from the longitudinal axis in a same direction.

The foregoing and other aspects of various disclosed embodiments will be apparent through examination of the following detailed description thereof in conjunction with the accompanying drawing figures, in which like reference numerals are used to represent like components throughout, unless otherwise noted.

DESCRIPTION OF THE DRAWING FIGURES

DETAILED DESCRIPTION

Certain aspects and features of the disclosed subject matter may be further understood with reference to the following description and the appended drawing figures. In operation, a self-stabilizing two-wheeled or inline vehicle may employ a hinge or hinge assembly to drive a position of one portion of a vehicle frame (i.e., an operator frame portion) relative to another portion of the vehicle frame (i.e., a base portion) to manipulate a location of the overall center of gravity of the vehicle (as a whole) in such a manner as to maintain the vehicle in an upright position.

In some instances, the hinge axis may be horizontal, while in other instances, the hinge axis may be vertical. In the case where the hinge axis is horizontal, an operator frame portion may rotate about the horizontal hinge axis (e.g., in a "rolling" motion), moving a portion of the overall vehicle center of mass to one side of that horizontal axis, thus providing a stabilizing force. Alternatively, in the case where the hinge axis is vertical, an operator frame portion may rotate about the vertical hinge axis (e.g., in a "yawing" motion), moving a portion of the overall vehicle center of mass to one side of that vertical axis, thus providing a stabilizing force.

As noted above and set forth in more detail below, a self-stabilizing vehicle may comprise two steerable wheels for increased maneuverability, especially at low speeds. In cooperation with the disclosed self-stabilization functionality, such a vehicle may be balanced even at a virtual standstill, and may execute zero-radius turns. Additionally, in the event that both of the steerable wheels are powered, the vehicle may move diagonally or even sideways relative to a longitudinal axis.

Figure 1:
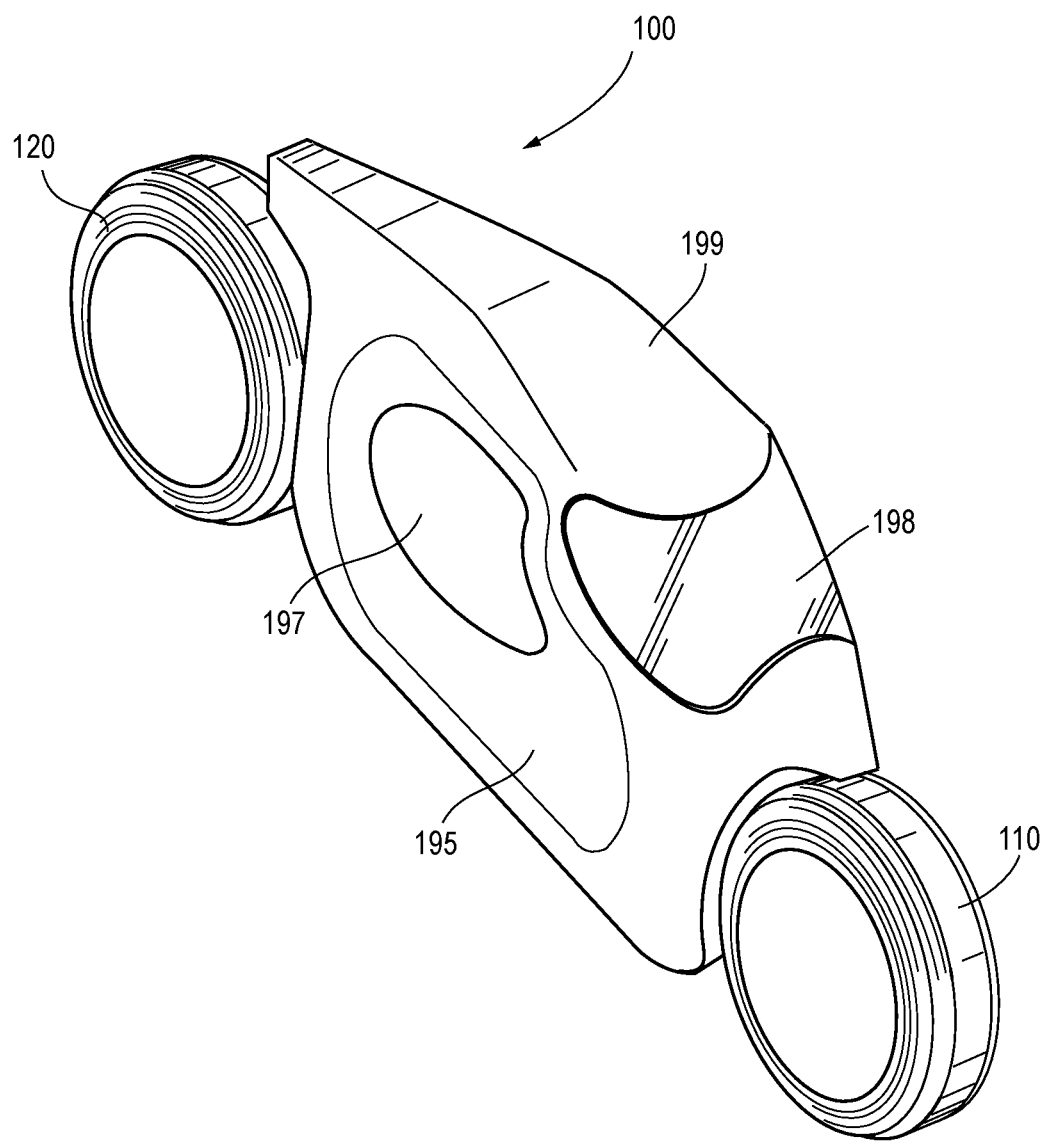
FIG. 1 is a front perspective view of a two-wheeled vehicle.

Turning now to the drawing figures, FIG. 1 is a front perspective view of a two-wheeled vehicle. In the context of the present disclosure, it will be appreciated that a the term "two-wheeled vehicle" generally applies to vehicles having two wheels oriented in a "tandem" configuration, meaning that one wheel is generally situated or deployed "in front" of the other, dictated by the direction of travel. Motorcycles, mopeds, bicycles, and two-wheeled scooters generally fall into this category, though other embodiments are contemplated. For example, the illustration in FIG. 1 depicts a two-wheeled vehicle 100 (that might be categorized as a motorcycle, scooter, or bicycle, in some situations) having a first wheel 110 located in front of (relative to the direction of travel of vehicle 100 in ordinary use) a second wheel 120.

In some implementations, an external shell 199 or faring may be applied to, attached to, or otherwise integrated or associated with vehicle 100. In that regard, shell 199 may include a door 195 or other means of ingress and egress, a windscreen 198 or windshield, and one or more side windows 197 or rear windows (not illustrated) to allow for or otherwise to accommodate a field of view of the exterior by an operator situated within shell 199. Shell 199 may provide an operator of vehicle 100 with some impact protection, as well as protection from adverse weather conditions, dust, road debris, and the like.

Shell 199 and door 195 (including their respective structural elements, support members, and components) may be manufactured of metal (such as aluminum, titanium, steel, stainless steel, an alloy or alloys, etc.) as is typical in vehicle construction; additionally or alternatively, shell 199 and door 195 (or components thereof) may be constructed of light-weight materials such as plastics, ceramics, or composites (for example, fiber glass, carbon fiber, or other layered compositions). Windscreen 198 and side window 197 may be manufactured of glass, plastic, acrylics, or other suitably transparent materials as are generally known in the art of vehicle design and manufacture.

It is noted that provision of shell 199 as depicted in FIG. 1 generally obscures (from a viewpoint exterior to shell 199), but does not prevent or otherwise impede, the articulation of sections of a frame as described below; in that regard, shell 199 may be implemented to include enough interior space to accommodate the articulation set forth herein when an operator portion of a frame moves through its entire range of travel. It is also noted that the present disclosure is not intended to be limited by the nature, material selection, operational characteristics, or even the inclusion of, shell 199, and that some implementations (such as motorcycles or mopeds, for instance) may generally not include shell 199 at all, though conventional aerodynamic fairings, wind deflectors, or the like may be employed.

Figure 2:
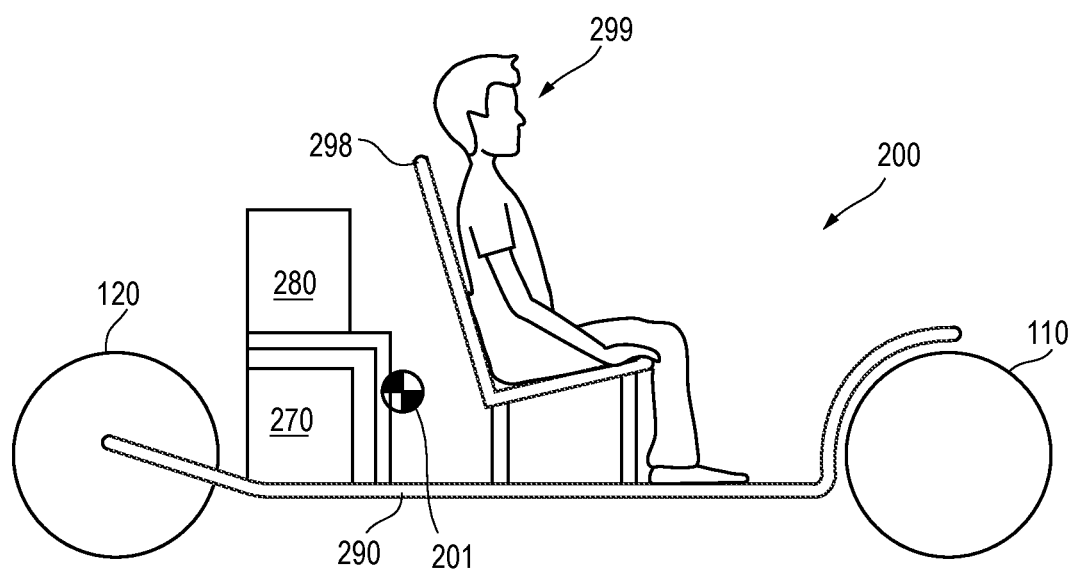
FIG. 2 is a simplified side view diagram of a prior art two-wheeled vehicle having a conventional frame and illustrating a location of the vehicle's center of mass.

FIG. 2 is a simplified side view diagram of a prior art two-wheeled vehicle having a conventional frame and illustrating a location of the vehicle's center of mass. The illustration in FIG. 2 depicts a prior art two-wheeled vehicle 200 in a tandem wheel configuration with a first wheel 110 located in front of (relative to the direction of travel of vehicle 100 in ordinary use) a second wheel 120. Typically, such a prior art two-wheeled vehicle 200 may be characterized by a rigid, unitary or uni-body frame 290 that supports an operator 299 on a seat 298 or other support structure, an on-board computer or electronics package (and attendant batteries, control circuitry, sensors, and the like; referred to herein as an "electronics assembly" and designated by reference numeral 280), a motor (and attendant electronics, fuel source, pumps, and supporting structure or other components, as applicable; referred to herein as a "motor assembly" and designated by reference numeral 270), and other structural or operational components (not illustrated) necessary or desirable for safe or efficient operation of vehicle 200. In that regard, certain structural and operational components, such as suspension linkages or supporting apparatus, drive trains, brakes, fluid and electrical conduits, structural support mechanisms, and the like, have been omitted from FIG. 2 for clarity. It is also noted that electronics assembly 280, motor assembly 270, or both, may be omitted in some implementations (such as in the case of a bicycle or other human-powered vehicle 200, for instance).

It will be appreciated that a location (in terms of both a height above the point where wheels 110 and 120 meet a roadbed or other surface and a lateral distance between wheels 110 and 120) of an overall, or total, center of mass, $m_t$, of prior art vehicle 200 is represented by reference numeral 201 as an example only, and not by way of limitation. Specifically, a location of center of mass 201 may depend upon, among other things, the respective masses and relative locations (both vertically and horizontally) of frame 290, electronics assembly 280, motor assembly 270, operator 299, seat 298, and other components of vehicle 200, including but not limited to wheels 110 and 120.

Importantly, given rigid, unitary frame 290, when a prior art vehicle 200 rotates about a longitudinal axis (i.e., an axis running parallel to a road surface from back to front through the wheels 120 and 110, respectively), the resulting tilt or "roll" of frame 290 about that axis will tend to de-stabilize vehicle 200, meaning that such a tilt or roll will tend to increase unless counteracted by some input from operator 299 or rider. In a departure from conventional technologies, however, a self-stabilizing two-wheeled vehicle having an articulated frame may generally comprise active components that tend to counterbalance such tilt or roll, substantially as set forth below.

Figure 3:
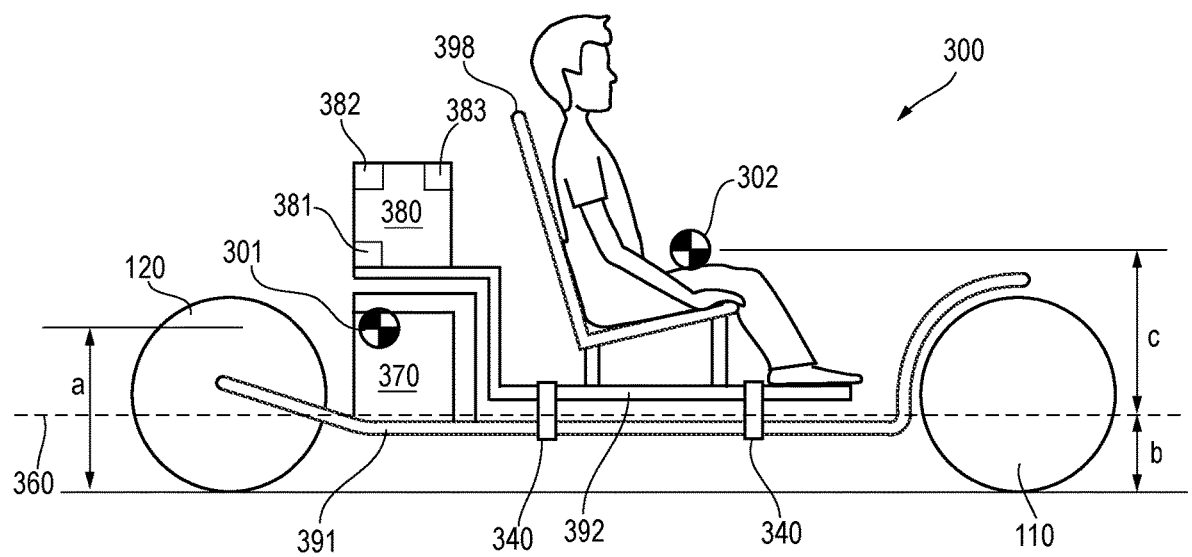
FIG. 3 is simplified side view diagram illustrating one embodiment of a self-stabilizing two-wheeled vehicle.
Figure 4:
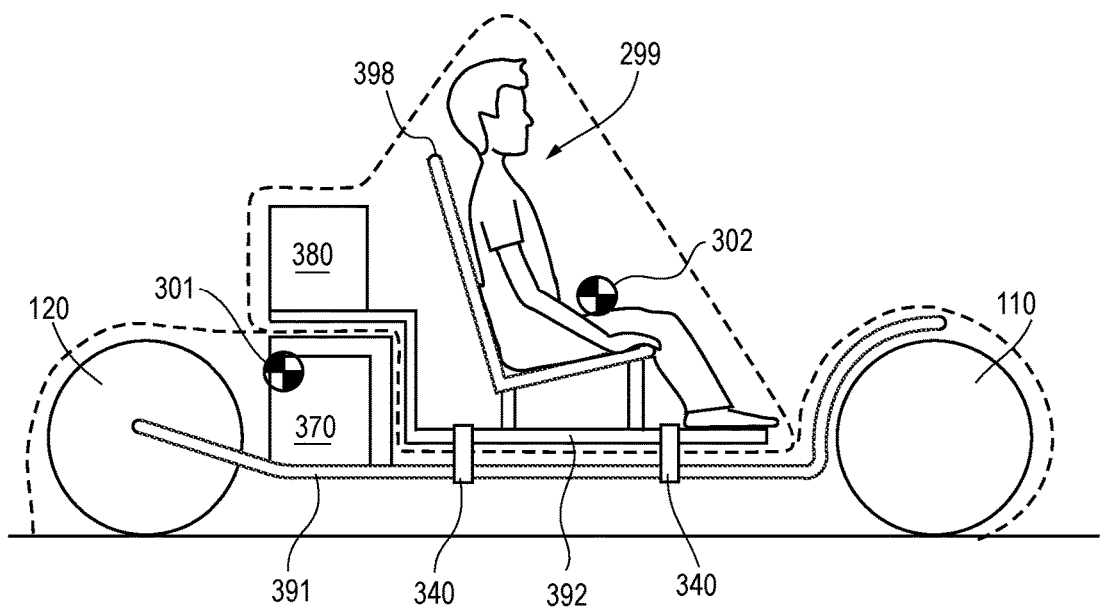
FIG. 4 is a simplified side view diagram illustrating the self-stabilizing two-wheeled vehicle of FIG. 3 and illustrating a location of the centers of mass of different frame portions.

FIG. 3 is simplified side view diagram illustrating one embodiment of a self-stabilizing two-wheeled vehicle, and FIG. 4 is a simplified side view diagram illustrating the self-stabilizing two-wheeled vehicle of FIG. 3 and illustrating a location of the centers of mass of different frame portions. As depicted in FIG. 3, a self-stabilizing vehicle 300 generally comprises a "front" wheel 110 and a "rear" wheel 120 arranged in a tandem configuration; in that regard, front wheel 110 and rear wheel 120 may generally be substantially aligned along a longitudinal axis 360 of vehicle 300. Additionally, vehicle 300 also comprises a base frame portion 391 that may be operably coupled to front wheel 110 and to rear wheel 120, an operator frame portion 392 to support an operator 299 of vehicle 300, such as on a seat 398 or other support structure, and a hinge assembly 340 operably coupling base frame portion 391 and operator frame portion 392. As with the depiction in FIG. 2, certain structural and operational components, such as suspension linkages or supporting apparatus, drive trains, brakes, fluid and electrical conduits, structural support mechanisms, and the like, have been omitted from FIGS. 3 and 4 for clarity.

As noted above, base frame portion 391 may be operably coupled to front wheel 110 and to rear wheel 120, such as via a suspension system (e.g., shocks, struts, forks, and other conventional components), and may generally comprise, support, carry, or otherwise accommodate a motor assembly 370. It will be appreciated that mounting or attaching motor assembly 370 to base frame portion 391 may facilitate maintaining a low overall center of mass for vehicle 300, as a whole. This may be particularly true in the case where motor assembly 370 and its associated drive train and functional components represent a sizeable percentage of the overall weight of vehicle 300, as is typical in light, two-wheeled vehicles.

Motor assembly 370, in turn, generally comprises electronics, a fuel source, pumps, and supporting structure or other components, as applicable, depending upon the nature and operational characteristics of the motor used to propel vehicle 300. For instance, motor assembly 370 may be embodied in or comprise an electric motor or a series or cluster of electric motors, in which case, motor assembly 370 may comprise a battery or fuel cell for generating electricity to drive the motor or motors, electronics to control or otherwise to regulate or to influence motor output, transformers or other voltage or current regulators, cooling vanes or fans, etc. Alternatively, motor assembly 370 may be embodied in or comprise an internal combustion engine, in which case, motor assembly 370 may comprise a fuel tank or source, a transmission, a radiator and coolant tank, etc. Motor assembly 370 may include a hybrid engine (i.e., an internal combustion engine coupled to an electric motor and a clutch selectively to engage either) or other engine suitable for propelling vehicle 300 through its intended operational speed range. The present disclosure is not intended to be limited by the nature or operational characteristics of motor assembly 370, which may be influenced by, or selected in accordance with, a variety of factors including cost, weight, physical dimensions or displacement, performance requirements, the intended operating capabilities and range of vehicle 300, or a combination of these and other design choices.

As noted above, operator frame portion 392 may be implemented generally to support an operator 299 of vehicle 300, such as on seat 398 or other support structure. In the implementation of FIGS. 3 and 4, operator frame portion 392 also comprises or supports an electronics assembly 380 to control or otherwise to influence operation of vehicle 300, and optionally also to support operation of motor assembly 370. In that regard, electronics assembly 380 may generally be embodied in or comprise an on-board computer or electronics package 381, one or more batteries or battery cells 382, one or more sensors 383 or sensor clusters, and the like.

In operation, battery cells 382 may power electronic components, data processors, memory components, and sensors 383 that are necessary or desirable for operation of vehicle, as well as powering hinge assembly 340 as set forth below. Additionally, battery cells 382 may also be used to power lights, directional signals, windscreen wipers, instrumentation, heaters, etc. as is typical in vehicle design and operation. Battery cells 382 may also be used to power, or to support the operation of, some or all of the components of motor assembly 370 in some implementations.

Sensors 383 may be employed to collect vehicle operational data for use, aggregation, processing, or storage by electronics package 381. Sensors 383 may be embodied in or comprise a speed sensor (such as a speedometer) to collect instantaneous speed data as vehicle 300 is in motion or at rest; additionally, sensors 383 may be embodied in or include an inertial sensor (such as a gyroscope, an accelerometer, or a similar sensor as is generally known in the art) to collect inertial data as vehicle 300 accelerates, turns around a corner, tilts about an axis, traverses a rough patch of road, or the like. Any of various speed and inertial sensors 383 may be employed as necessary or desired for supporting the functionality set forth below, and the present disclosure is not intended to be limited by the specific technology used to collect the operational data that influences operation of vehicle 300.

Electronics package 381 may generally be embodied in or comprise an on-board computer or data processor. In that regard, electronics package 381 may include a microprocessor or microcontroller, a field programmable gate array, an application specific integrated circuit, a digital signal processor, or other electronic component capable of data processing operations that support operation of vehicle 300. Electronics package 381 may also include memory to support operation of the data processing component, as is generally known in the art.

In operation, electronics package 381 may serve as a control unit, for instance, governing vehicle 300 operation and performance. In that regard, electronics package 381 may support typical vehicle functions such as selectively adjustable fuel economy modes, operation of instrumentation and displays for providing useful information to operator 299, navigation, fault condition detection and diagnostics, and the like. Additionally, in accordance with the "control unit" functionality of electronics package 381, the data processing component may receive inertial data, instantaneous speed data, or both, from sensors 383 and process those data (in cooperation with software applications or other instruction sets, for instance, stored in memory and accessible to the data processing component) to determine the state and orientation of base frame portion 391 and operator frame portion 392 and to drive hinge assembly 340 as desired or necessary to stabilize vehicle 300; as set forth in more detail below with reference to FIG. 15, electronics package 381 may additionally receive steering inputs (e.g., from an operator's interaction with a suitable steering control input mechanism) and use such inputs to control an angle of deflection, and, in the case of powered wheels, a direction and a rate of roll for one or both of the front and rear wheels.

As noted above, hinge assembly 340 may be implemented operably to couple base frame portion 391 and operator frame portion 392. In the configuration illustrated in FIGS. 3 and 4, two hinge assemblies 340 are employed, but any number may be implemented as a design choice. In some arrangements, more hinge assemblies 340 spread further across longitudinal axis 360 may provide additional rigidity, and smaller hinges may be driven faster than larger ones, so response times to input from electronics package 381 may be reduced in the case of many smaller hinge assemblies 340 as compared to fewer larger hinge assemblies 340.

Specifically, hinge assembly 340 generally allows operator frame portion 392 to rotate about a hinge axis relative to base frame portion 391 (in the FIG. 3 configuration, the hinge axis is substantially parallel to longitudinal axis 360, though other configurations differ as set forth below). The goal of such a rotation is to position, relative to a center of mass of base frame portion 391 (and that which it supports), a center of mass of operator frame portion 392 (and that which it supports) in such a manner as to maintain stability of vehicle 300 during operation.

In that regard, and as noted above, FIG. 4 is a simplified side view diagram illustrating the self-stabilizing two-wheeled vehicle of FIG. 3 and illustrating a location of the centers of mass of different frame portions. As illustrated in FIG. 4, the operator frame portion mass 302 includes the respective masses of at least operator frame portion 392, operator 299, seat 398, and electronics assembly 380, whereas the base frame portion mass 301 includes the respective masses of at least wheels 110 and 120, base frame portion 391, and motor assembly 370. The masses of hinge assemblies 340 span the boundary between these two masses 301 and 302, and contribute a fraction of their own masses to both.

As best illustrated in FIG. 3, a center of mass, $m_2$, of operator frame portion 392 (reference numeral 302) may be generally located at a height (b+c) above the bottom of wheels 110 and 120, where (b) is the distance from the ground to the hinge axis (described below), and (c) is the distance from the hinge axis to center of mass 302. Similarly, a center of mass, $m_1$, of base frame portion 391 (reference numeral 301) is generally located at a height (a) above the bottom of wheels 110 and 120. It will be appreciated that the locations (including the horizontal positions along longitudinal axis 360) of centers of mass 301 and 302 are illustrated by way of example only, and that these positions will depend upon a variety of factors such as the respective masses and locations of the illustrated components, as well as the respective masses and locations of the various components and structural elements that have been omitted from the drawings for clarity. In accordance with aspects of the disclosed subject matter, using hinge assembly 340 to rotate operator frame portion 392 relative to base frame portion 391 tends to move center of mass 302, in a controlled manner, off of a vertical plane running through longitudinal axis 360, which counterbalances tilt or roll of base frame portion 391. The result is a stable vehicle 300.

In one implementation, for instance, a control unit (i.e., electronics package 381 components, including a digital data processing hardware component and suitable software instruction sets) may receive, from an inertial sensor 383, inertial data related to a deviation of base frame portion 391 from a vertical plane through longitudinal axis 360 (i.e., indicating a tilt or roll of base frame portion 391) and may additionally receive, from a speed sensor 383, instantaneous speed data related to a rate of travel of vehicle 300. Following data processing operations at electronics package 381, the control unit may then drive hinge assembly 340, causing operator frame portion 392 to rotate about a hinge axis as a function of the inertial data and the instantaneous speed data. As noted above, the arrangement illustrated in FIGS. 3 and 4, in which the hinge axis is substantially parallel to longitudinal axis 360, is shown by way of example only, and not by way of limitation. For example, in accordance with some aspects of the disclosed subject matter addressed below, the hinge axis may be substantially normal to longitudinal axis 360.

In some implementations, the control unit computes an angle through which to rotate operator frame portion 392 and a torque to apply to hinge assembly 340 to effectuate that result in a short enough time period to be effective to stabilize vehicle 300 throughout its normal operating range. The speed and the force with which hinge assembly 340 rotates operator frame portion 392 about the hinge access may depend upon a variety of factors, including instantaneous speed of vehicle 300 and input from inertial sensors 383, as noted above; other data that may be used to compute or otherwise to determine instructions to drive hinge assembly 340 also may include, in some implementations, input from operator 299 (such as via vehicle 300 controls or via shifting position in seat 398), as well as the rate of change of the data values collected by sensors 383 and received by electronics assembly 380 components (which in turn may be influenced by input from operator 299).

As noted above, a data processing component and suitable software at electronics package 381 may process the foregoing operational data (e.g., received from sensors 383 and operator 299) to drive (i.e., to control operation of) hinge assembly 340 so as to keep vehicle 300 stable. It will be appreciated that such processing may be "real-time" or "near real-time" successfully to stabilize vehicle 300 dynamics in real-world, ever-changing driving conditions. While the disclosed subject matter is not intended to be limited by any particular technology or digital data processor implementation utilized in electronics assembly 380, it is noted that electronics package 381 and sensors 383 may be selected to accommodate high bandwidth, high speed, and computationally expensive data processing operations suitable to make adjustments and to drive hinge assembly 340 quickly enough to stabilize vehicle 300 during use.

The software algorithms and data processing operations described herein (as well as the electronics package 381 selected to execute those operations) may be application- and vehicle-specific, and may be selected and modified as a design choice or otherwise as a function of a variety of factors. For instance, the speed, force, and response times used by electronics package 381 for selectively driving hinge assembly 340 may be tuned in a particular manner in the event that vehicle 300 is intended for high-speed, agile use on a race course, but tuned in a very different manner in the event that vehicle 300 is intended to be used for low-speed commuting on congested city streets. In the event that vehicle 300 is a motorcycle and the mass of operator 299 is a significant contribution to the location of center of mass 302, the algorithms and data processing methodologies used by electronics package 381 may be different than in the event that vehicle 300 is larger and base frame portion mass 301 is more significant, as compared to the mass of operator 299, than in a typical motorcycle application.

In some applications, it may be desirable that the control unit selectively ceases operation when the instantaneous speed data indicates that the rate of travel of vehicle 300 exceeds a threshold. In such circumstances (e.g., where rotational inertia of wheels 110/120 is sufficient to provide stabilization or when self-stabilization via hinge assembly 340 is otherwise not desired), hinge assembly 340 may be locked, or prevented from causing movement of operator frame portion 392 relative to base frame portion 391. It will be appreciated that the same may be true for parking vehicle 300 or in instances where vehicle 300 is at rest for extended periods of time. For instance, hinge assembly 340 may be locked, or prevented from causing movement of operator frame portion 392, in situations where a "Parking" gear is selected, when a kickstand or other support structure is engage, or otherwise when vehicle 300 has remained at rest for a threshold period of time. In such circumstances, electronics package 381 may determine that vehicle 300 is not in use, and may disable the self-correcting algorithms and mechanical responses to achieve that functionality.

It will be appreciated that hinge assembly 340 may generally include an actuator controlling an angle of a hinge (see, e.g., reference numeral 701 in FIG. 7, described below); the particular angle may be computed or otherwise determined substantially as set forth above. In that regard, FIGS. 5 through 7 are simplified diagrams illustrating details of a hinge assembly for use in connection with a self-stabilizing two-wheeled vehicle.

Figure 5:
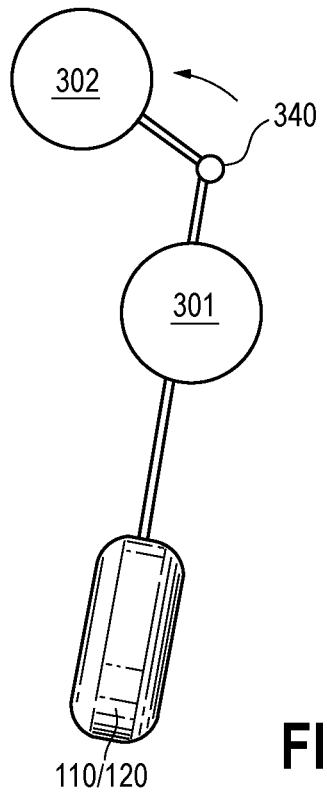
FIGS. 5 through 7 are simplified diagrams illustrating details of a hinge assembly for use in connection with a self-stabilizing two-wheeled vehicle.
Figure 6:
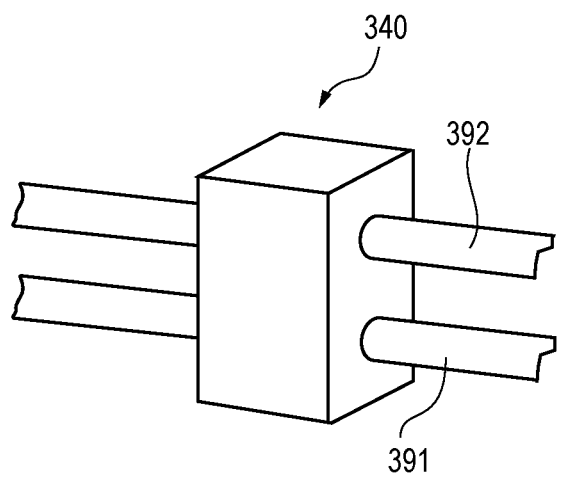

FIG. 5 is an abstracted version of an inverted, split pendulum, and illustrates one implementation of the disclosed subject matter. In the FIG. 5 view, the perspective is from either the front or rear of vehicle 300. As is generally known, during operation of a two-wheeled vehicle in a tandem configuration (such as vehicle 300), wheels 110/120 may tilt or roll off of a vertical plane. This may happen for a variety of reasons, including input from operator 299, roadbeds that are not level, forces exerted during turns, swerves, or evasive maneuvers, and the like. One of the benefits of a light-weight two-wheeled vehicle (such as vehicle 300) is maneuverability, and one factor that facilitates maneuverability is the operator's ability to influence direction with weight shifts and control inputs, which tend to push the center of mass of vehicle 300 off of the vertical axis to facilitate maneuvers desired by operator 299. In response to tilting or rolling of wheels 110/120 off of a vertical plane, moving center of mass 301 of base frame portion 391 off of that plane (to the right in FIG. 5), hinge assembly 340 may be actuated (e.g., responsive to operator 299 input, output from the control unit, or both) to move center of mass 302 (i.e., to the left in FIG. 5, as indicated by the arrow) of operator frame portion 392 to counteract the forces created by movement of center of mass 301.

Figure 7:
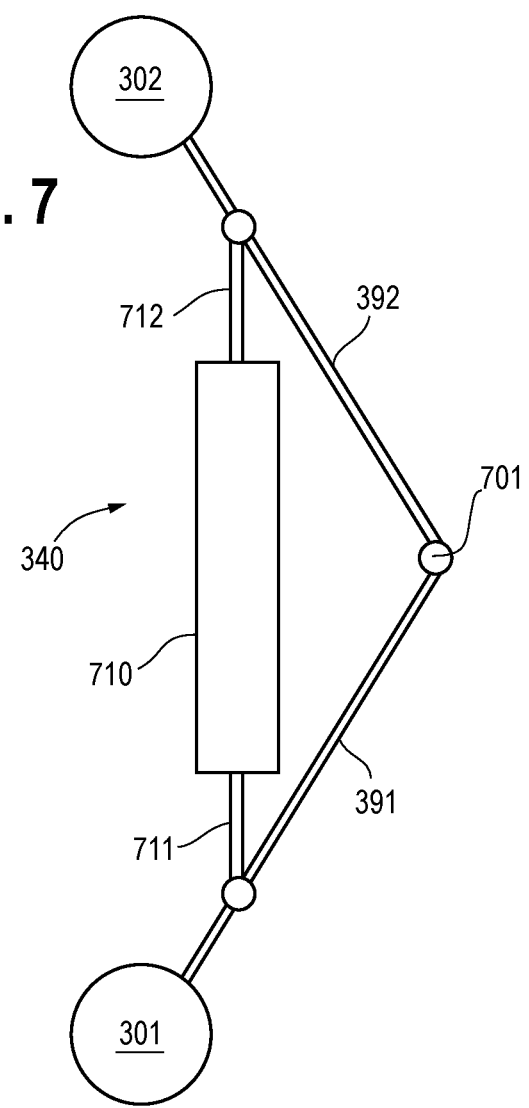

The foregoing may be effectuated, in some implementations, via an actuator 710 as illustrated in FIG. 7. Specifically, responsive to input or instructions from a control unit (such as electronics package 381, for example), actuator 710 may selectively extend or retract actuator arms 711, 712, or both, changing the angle at which base frame portion 391 and operator frame portion 392 meet at hinge 701. As illustrated in FIG. 7, actuator arms 711 and 712 are attached, coupled, or otherwise operably connected to base frame portion 391 and to operator frame portion 392, respectively. Accordingly, where base frame portion 391 is fixedly attached to actuator arm 711, but operator frame portion 392 is allowed to rotate about a hinge axis (see FIG. 6), manipulation of actuator arms 711 and 712, under control of the control unit, causes rotation of operator frame portion 392 about the hinge axis.

It will be appreciated that any of various mechanical connections may be employed at hinge 701 to effectuate this result or otherwise to accommodate this hinged attachment allowing relative movement between two relatively rigid structures or structural assemblies. Hinge 701 may be embodied in or comprise a butt hinge, a knife hinge, a continuous hinge, a flag hinge, or any other type of hinge as is generally known in the art and suitable to handle the loads required by centers of mass 301 and 302, as well as the torque applied by actuator 710. In some applications, it may be desirable that hinge 701 is spring-loaded or otherwise (e.g., electronically or hydraulically) biased to return to a resting or default state in the absence of torque applied by actuator arms 711 and 712 under control of the control unit.

It will also be appreciated that actuator 710 may be embodied in or comprise an hydraulic actuator, although other alternatives (such as electrical actuators, piezo-electric actuators, or other technologies) may be suitable, again, as a design choice or in accordance with application-specific considerations such as cost, performance requirements, and ease of integration with existing or proposed structural and electronic components. The present disclosure is not intended to be limited by the specific structural arrangements or physical components of hinge assembly 340, but it is noted that hinge assembly 340 may be operative responsive to input from electronics assembly 380 in general, and to electronics package 381 or components thereof, in particular, to apply necessary force to actuator arms 711 and 712 (or to other suitable components of hinge assembly 340) to move operator frame portion 392 as set forth herein, irrespective of the specific structural elements of hinge assembly 340 or its method of operation.

Figure 8:
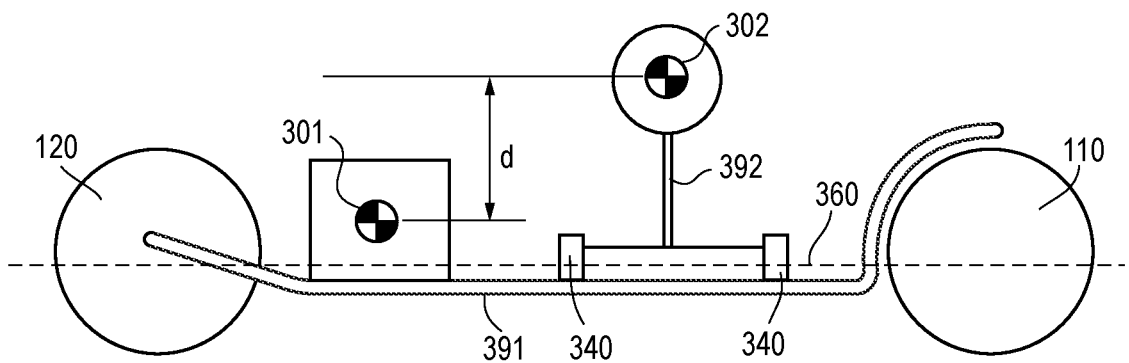
FIGS. 8 through 10 are abstract diagrams illustrating, respectively, side, front, and side views of elements of a self-stabilizing two-wheeled vehicle in accordance with one embodiment.
Figure 9:
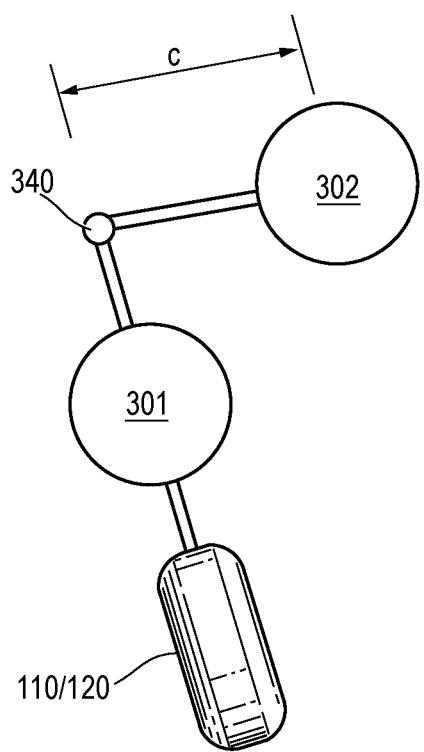
Figure 10:
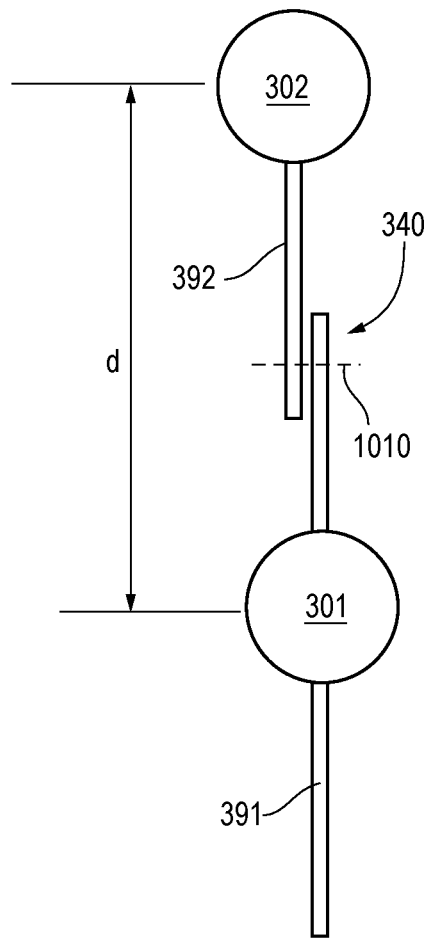

FIGS. 8 through 10 are abstract diagrams illustrating, respectively, side, front, and side views of elements of a self-stabilizing two-wheeled vehicle in accordance with one embodiment. FIGS. 8 and 10 are stylized, abstracted side view perspectives of the self-stabilizing two-wheeled vehicle 300 illustrated in FIGS. 3 and 4, as discussed above, and FIG. 9 is an abstract illustration (from the front or back) of the correction described above with reference to FIG. 5. It is noted that the abstracted FIG. 10 view omits wheels 110/120 and other structures contributing to center of mass 301 for clarity, and only illustrates base frame portion 391 structure in the abstract—it is not intended to be to scale or to depict the structural elements or operational components described above.

As noted above, in this configuration, wheels 110 and 120 may generally be substantially aligned along longitudinal axis 360, and a hinge axis (reference numeral 1010 in FIG. 10) may be substantially parallel to longitudinal axis 360.

In the FIG. 9 view (as with FIG. 5), the perspective is from either the front or rear of vehicle 300. Wheels 110/120 may tilt or roll off of a vertical plane, moving center of mass 301 of base frame portion 391 off of that plane (to the left in FIG. 9). In response, hinge assembly 340 may be actuated (e.g., responsive to operator 299 input, output from the control unit, or both) to move center of mass 302 of operator frame portion 392. In FIG. 9, center of mass 302 is shown as having been moved to the right, via actuation of hinge assembly 340, to counteract the forces created by movement of center of mass 301. As noted above, the angle through which hinge assembly 340 moves center of mass 302 (i.e., by rotating operator frame portion 392 about hinge axis 1010 (FIG. 10)) and the torque applied to effectuate that result may be computed by a control unit comprising elements of electronics assembly 380 as a function of forward speed of vehicle 300, input from operator 299, input from sensors 383, the distance (c) between hinge axis 1010 and center of mass 302, the vertical distance (d) between the centers of mass 301 and 302, or a combination of these and a variety of other factors; additionally or alternatively, it may be desirable in some instances not to make the correction illustrated in FIG. 9, for instance, if the speed of vehicle 300 rises above a particular threshold, if the vehicle 300 is in a parked or inoperative mode, or otherwise as a function of data received from inertial sensors 393.

Figure 11:
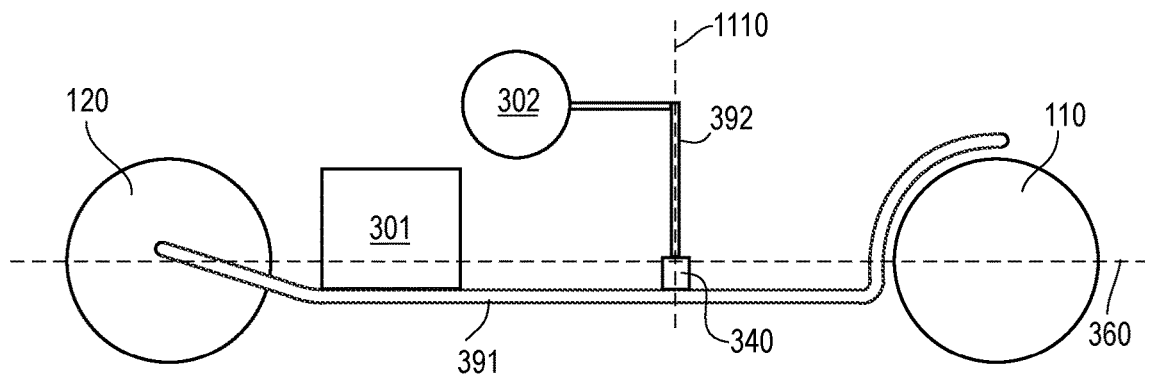
FIGS. 11 through 13 are abstract diagrams illustrating, respectively, side, front, and side views of elements of a self-stabilizing two-wheeled vehicle in accordance with another embodiment.
Figure 12:
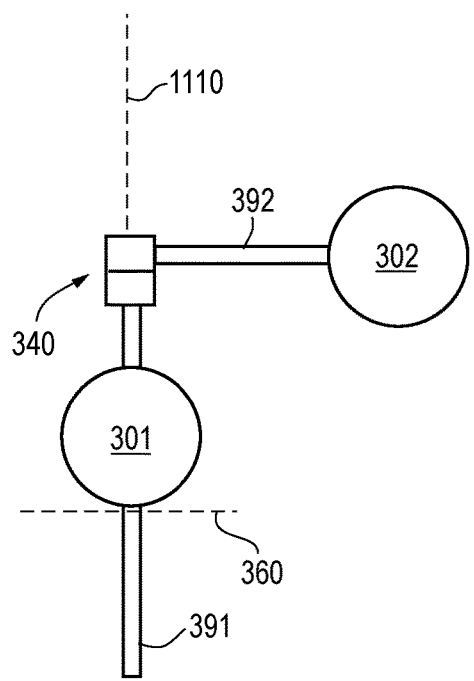
Figure 13:
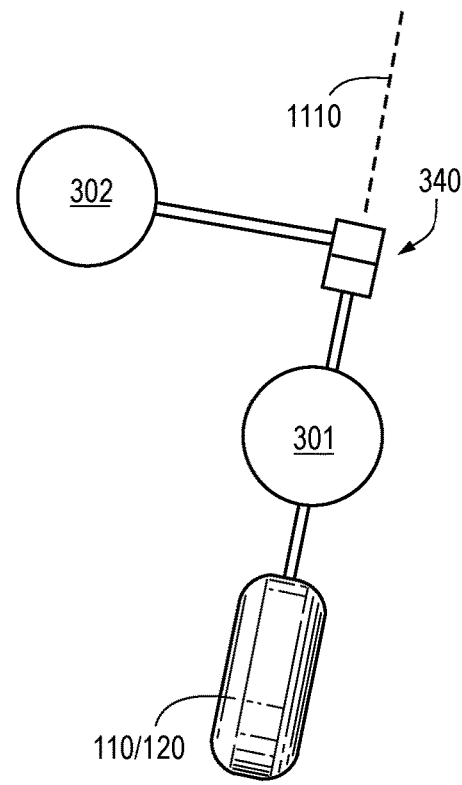

FIGS. 11 through 13 are abstract diagrams illustrating, respectively, side, front, and side views of elements of a self-stabilizing two-wheeled vehicle in accordance with another embodiment. In the case of FIGS. 11 through 13, a hinge axis 1110 is substantially normal to longitudinal axis 360 of vehicle; it will be appreciated that rotation about this hinge axis 1110 may cause operator frame portion 392 to swing out or to "yaw" (e.g., to the left or to the right) relative to the direction of travel of vehicle 300, as opposed to rolling or tilting substantially along longitudinal axis 360 as in the embodiment of FIGS. 3 through 5 and 8 through 10.

This is best illustrated in FIG. 13, which depicts a front or rear view of vehicle 300. Responsive to a roll or tilt of wheels 110/120 off of a vertical plane (due to a variety of factors, as set forth above), moving center of mass 301 of base frame portion 391 off of that plane (to the right in FIG.

13), hinge assembly 340 may be actuated (e.g., responsive to operator 299 input, output from the control unit, or both) to move center of mass 302 of operator frame portion 392 (e.g., to the left in FIG. 13), so as to counteract the forces created by movement of center of mass 301 off of the vertical plane. FIG. 12 is a side view of the same implementation, illustrating that hinge axis 1110 may be substantially normal to longitudinal axis 360. It is noted that the abstracted FIG. 12 view, as with the version in FIG. 10, omits wheels 110/120 and other structures contributing to center of mass 301 for clarity, and only illustrates base frame portion 391 structure in the abstract—it is not intended to be to scale or to depict the structural elements or operational components described above.

Figure 14:
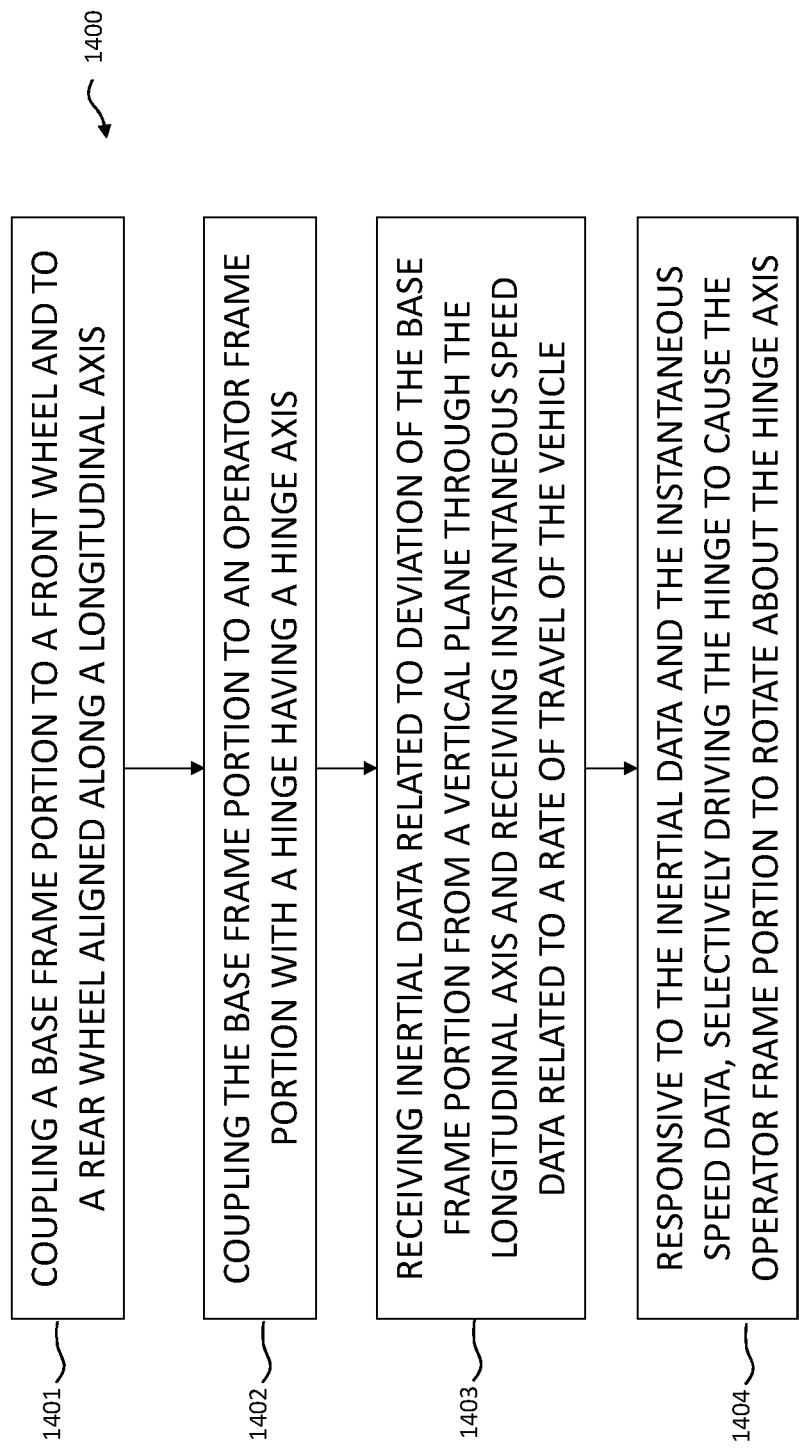
FIG. 14 is a flow diagram illustrating aspects of one embodiment of a method of stabilizing a two-wheeled vehicle.

FIG. 14 is a flow diagram illustrating aspects of one embodiment of a method of stabilizing a two-wheeled vehicle. It will be appreciated that the following method may be executed by or in conjunction with any of the various structural and electrical components set forth above.

In accordance with aspects of the present disclosure, a method 1400 of stabilizing a two-wheeled vehicle may generally begin with coupling a base frame portion (such as reference numeral 391) of the vehicle (such as vehicle 300) to a front wheel and to a rear wheel that are substantially aligned along a longitudinal axis (such as 360), as indicated at block 1401. This is the tandem configuration described above; accordingly, the vehicle contemplated in the FIG. 14 methodology may be a motorcycle, a moped, a bicycle, a two-wheeled scooter, or any other vehicle having such a tandem wheel configuration.

The method may continue with coupling the base frame portion (391) to an operator frame portion (such as reference numeral 392) with a hinge (such as hinge assembly 340) having a hinge axis (such as 1010 or 1110) as set forth in block 1402. This hinge axis (1010 or 1110) may be substantially parallel to the longitudinal axis (360), or it may be substantially normal to the longitudinal axis (360), though other implementations are also possible, and may be application- or vehicle-specific. As noted above, the operator frame portion (392) may support an operator (299) of the vehicle and may be selectively rotatable relative to the base frame portion (391) about the hinge axis (1010 or 1110).

As indicated at block 1403, the method may continue with receiving, from an inertial sensor (such as sensor 393), inertial data related to operation of the vehicle (300). In the examples provided above, such inertial data may be related to deviation of the base frame portion (391) from a vertical plane through the longitudinal axis (360), although other data parameters are contemplated. Further, such inertial data may be received from a gyroscope, an accelerometer, or any other inertia sensor, depending upon design choices, cost, size, weight, power consumption, or a combination of these or a variety of other factors. Additionally, the method (also in block 1403) may include receiving, from a speed sensor (such as sensor 393), instantaneous speed data related to a rate of travel of the vehicle (300). These speed data may be collected by speedometers, pitot tubes, or other speed sensors (383) and provided to the control unit (e.g., components of electronics package 381 in electronics assembly 380) in accordance with any of various conventional technologies.

Operational parameters related to performance of vehicle (300), such as inertial data and instantaneous speed data, whether considered independently or in conjunction or cooperation with operator (299) input or other factors, may be employed by a control unit (such as components of electronics assembly 380, for instance) to instruct or otherwise to control the hinge (340) in accordance with data processing operations as set forth above.

Responsive to the inertial data and the instantaneous speed data (or other parameters acquired by sensors 383 and provided to electronics package 381, for instance), the method may continue with selectively driving the hinge (340) to cause the operator frame portion (392) to rotate about the hinge axis (1010 or 1110) to stabilize the vehicle (300) as indicated at block 1404.

It is noted that the arrangement of the blocks and the order of operations depicted in FIG. 14 are not intended to exclude other alternatives or options. For example, the operations depicted at blocks 1401 and 1402 may be reversed in order, or they may be made to occur substantially simultaneously in some implementations. Further, the operation depicted at block 1404 may occur substantially simultaneously with the operation depicted at block 1403 in instances where it is desirable to provide nearly instantaneous or real-time responses to driving conditions. Those of skill in the art will appreciate that the foregoing subject matter is susceptible of various design choices that may influence the order or arrangement of the operations depicted in FIG. 14.

Figure 15:
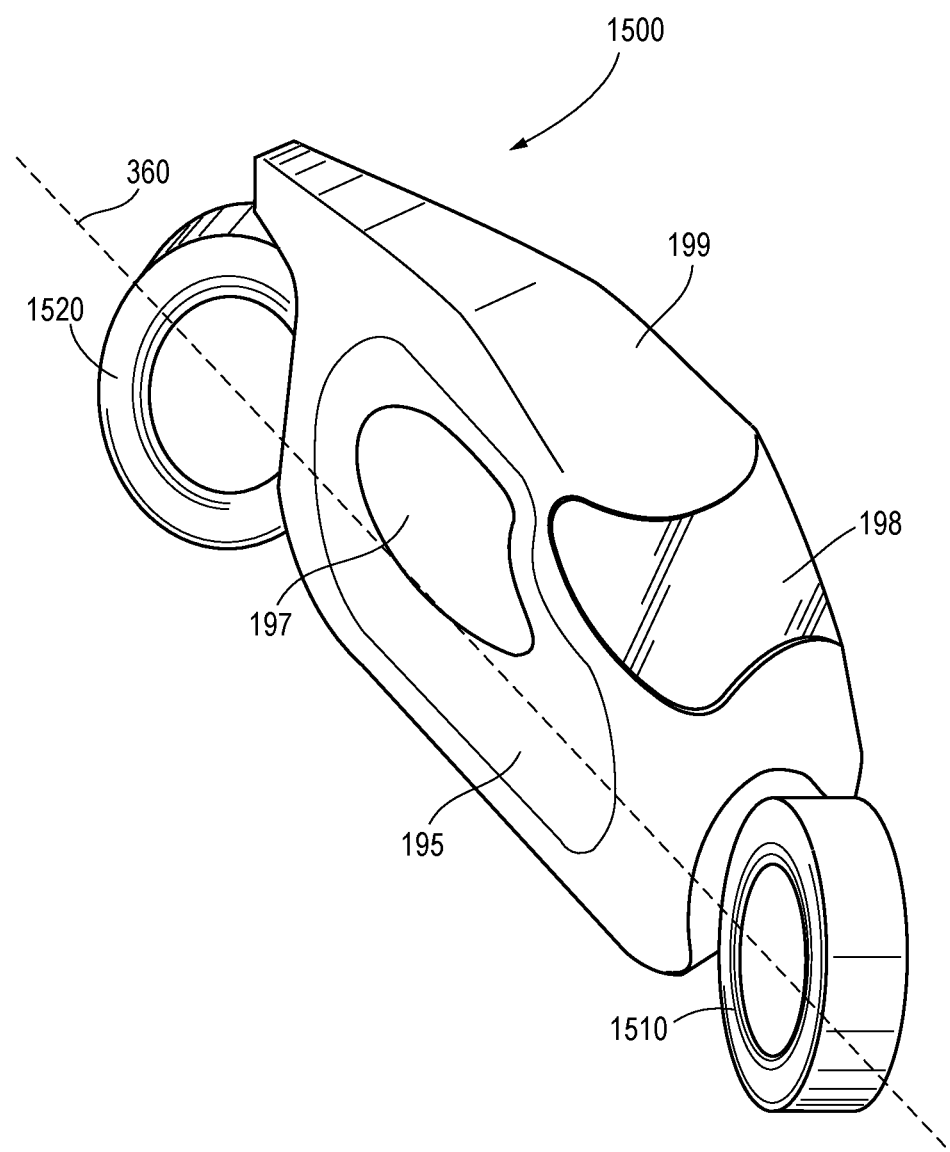
FIG. 15 is a front perspective view of a two-wheeled vehicle having two steerable wheels.

FIG. 15 is a front perspective view of a two-wheeled vehicle having two steerable wheels. The illustration in FIG. 15 depicts a two-wheeled vehicle 1500 (that might be categorized as a motorcycle, scooter, or bicycle, in some situations) having a first wheel 1510 located in front of (relative to the direction of travel of vehicle 1500 in ordinary use) a second wheel 1520.

In some implementations, as noted above in connection with FIG. 1, vehicle 1500 may generally comprise an external shell 199 or faring, a door 195 or other means of ingress and egress, a windscreen 198 or windshield, and one or more side windows 197 or rear windows (not illustrated) to allow for or otherwise to accommodate a field of view of the exterior by an operator situated within shell 199. It is noted that these components may be similar or identical in design, construction, and implementation as set forth above with specific reference to FIG. 1, and so that detailed description will not be repeated here.

In that regard, the FIG. 15 implementation may be similar in many respects to the two-wheeled vehicle illustrated and described above with reference to FIGS. 1 through 14, but the FIG. 15 version comprises a steerable second wheel 1520. Specifically, in this implementation of vehicle 1500, both first wheel 1510 and second wheel 1520 may be steerable to provide increased maneuverability at high speeds, and increased maneuverability and stability at low speeds, as compared to a similar vehicle with only a single steerable wheel. This approach may be referred to herein as "two-wheeled steering."

By way of background, it will be appreciated that in a typical two-wheeled vehicle, turning forces may be applied to one wheel (typically the front wheel) via a handlebar assembly, a steering wheel, a joystick, or other steering control input mechanism (i.e., the part of the system that receives control inputs from an operator). Responsive to such steering control inputs, the wheel rotates out of alignment with (or "deflects" from) a horizontal longitudinal axis (such as longitudinal axis 360) in the direction of travel, and may be assisted by intermediate components or actuator mechanisms such as hydraulic arms, worm gears or jack screws, rack and pinion or other gear assemblies, cables, chains, belts, pulleys, power steering modules (designed to make the actuator mechanisms more responsive to the control inputs) and the like. In some cases, such as the case of handlebars, for example, the control input includes a direct mechanical connection to the wheel axle—i.e., physical movement of the handlebars physically causes the wheel to deflect. In other cases, however, the control input does not directly move the wheel, but rather sends an electrical signal to a control unit (such as electronics assembly 380 and electronics package 381) which, in turn, sends electrical signals to drive the actuators that deflect the wheel—these are sometimes referred to as "fly-by-wire" systems, since there is not a physical connection (only an electrical one) between the control input and the structure or component that is actually making the wheel deflect. In the context of this disclosure, system and method enabling steerable wheels (such as illustrated at 1510 and 1520 in FIG. 15) may employ any number or variety of the foregoing components or approaches to providing steering force to wheels 1510 and 1520, either individually or collectively.

In some implementations, for example, there may be a direct mechanical connection between the wheels themselves, such that a given deflection of wheel 1510 (e.g., based upon a specific control input) will result in a coordinated deflection of wheel 1520 that is predetermined based upon the mechanical connection between the two. This may be accomplished via gear ratios, for instance, or via some other geometric parameter (length of a worm gear, angular offset of a pushrod, etc.) designed into a structure of the steering mechanism as a whole or as a function of the constituent mechanical components. In such implementations, it may be desirable to disable the two-wheel steering system (i.e., physically to disengage or decouple the mechanical connection between first wheel 1510 and second wheel 1520) selectively, for example, at the request of the operator, or automatically under electronic control, for example, as a function of speed, inertial data, or some other operational parameter. Embodiments may benefit from enabling or authorizing an operator to override a selection made by an on-board control unit, or vice-versa, under certain circumstances such as during emergency evasive maneuvering, low speed navigation in a parking lot, low traction situations, and the like.

Additionally or alternatively, an electronic or fly-by-wire system may be used in accordance with which one or both of wheels 1510 and 1520, the deflection of which may be driven by actuators under control of an electronic component (such as electronics assembly 380) executing computer code or other instruction sets. In that regard, electronics package 381, a component of electronics assembly 380, was described above in connection with self-stabilization functionality, but the data collected and processed by electronics package 381 may also enable two-wheeled steering, as well, particularly as such two-wheeled steering may ultimately facilitate stability in addition to providing non-conventional modes of motion as set forth below. Specifically, the data processing component of electronics package 381 may receive inertial data, instantaneous speed data, or both, from sensors 383 and process those data (in cooperation with software applications or other instruction sets, for instance, stored in memory and accessible to the data processing component) to determine the state and orientation of base frame portion 391 and operator frame portion 392 and to cause one or both of wheels 1510 and 1520 to deflect out of alignment with longitudinal axis 360 as desired or necessary to stabilize vehicle 1500, to decrease a turn radius, or to allow motion in one of a variety of modes (diagonally, sideways, zero-radius).

It will be appreciated that stabilization may be effectuated, and a particular desired mode of motion may be selected or determined, in accordance with a number of variables taken into consideration by the software executed by the data processing component. For example, as noted above, inertial data and instantaneous speed data may be useful in stabilizing vehicle 1500, but control inputs to the steering mechanism may also be employed effectively in cooperation with the other data inputs. In this context, an on-board control unit may be employed not only to actuate hinge assembly 340 for stability control, but also to implement two-wheeled steering (responsive to a steering control input signal) in cooperation with that effort; specifically, hinge assembly 340 and steering control for either or both of first wheel 1510 and second wheel 1520 may be coordinated as a function of inputs to electronics package 381 that are indicative of speed, inertia, steering control inputs reflective or indicative of a desired trajectory or related to an intended direction of travel of vehicle 1500, inferences related to road and traction conditions, and the like.

For instance, in the event of a high speed turn, it may be useful, depending upon the control input requesting the turn (i.e., the input that is indicative of or related to an intended direction of travel for vehicle 1500, as input by an operator, for instance), that the rear wheel 1520 deflect in the opposite direction from front wheel 1510. When front wheel 1510 deflects to the right and rear wheel 1520 deflects to the left, the rear of vehicle 1500 is actively encouraged to the left, helping direct the front of vehicle 1500 to the right, as suggested by the control input, taking into consideration the speed and inertial data; in some instances, the data processing results may indicate that the requested turn at the current speed may require more turning force than a single wheel can provide to satisfy the control input (given the speed and acceleration of vehicle 1500), thus the on-board control unit may provide a steering input to move the second wheel in the opposite direction.

Alternatively, given a similar input requesting a turn to the right at low to intermediate speeds, rear wheel 1520 may be controlled to deflect in the same direction as front wheel 1510. When both wheels are deflected in the same direction, a trajectory of vehicle 1500 may veer diagonally; in such a diagonal mode of motion, vehicle 1500 may sidle into a tight parallel parking slot, for instance, or move out of the path of an emergency vehicle without requiring that the overall orientation of vehicle 1500 change appreciably.

As another example, given the same input requesting a turn to the right, but at low to very low speeds, rear wheel 1520 may be controlled to deflect in the opposite direction as front wheel 1510, but to a greater degree. This may allow for very tight low speed turns, such as may be useful for "U" turns on narrow streets or into tight, side-by-side parking slots. In extreme versions of this operating mode, useful at speeds approaching zero, wheels 1510 and 1520 may be deflected to approximately 90 degrees (i.e., perpendicular) relative to longitudinal axis 360; this may allow for zero-radius turns, wherein vehicle 1500 may rotate about a vertical axis while wheels 1510 and 1520 describe an essentially circular path.

In situations in which wheels 1510 and 1520 are deflected to approximately 90 degrees relative to longitudinal axis 360, sideways motion of vehicle 1500 is also possible, in addition to the aforementioned zero-radius turn. For instance, where both wheels 1510 and 1520 are powered, they may be manipulated such that the rotational direction of each wheel 1510 and 1520 about its respective axle may be changed as a function of its angle relative to longitudinal axis 360 and the control inputs from an operator. Where both wheels 1510 and 1520 are normal to longitudinal axis 360 and are both powered to roll in the same direction, vehicle 1500 may be made to move sideways, i.e., perpendicular to longitudinal axis 360, for parking purposes, to inch closer to toll booths or service windows at banks or restaurants, and the like.

It will be appreciated that the foregoing modes of motion enabled by two-wheeled steering complement the self-stabilization functionality described above with reference to FIGS. 1 through 14, and each supports the capabilities of the other. The two-wheeled steering element allows electronics package 381 more flexibility in terms of self-stabilization, as it has more inputs to process (enabling computation of a better model of instantaneous vehicle dynamics) and more options for control. As noted above, using steering inputs in addition to instantaneous speed and inertial data obtained from sensors 383, electronics package 381 may change the deflection angle of one or both of wheels 1510 and 1520 in addition to driving hinge assembly 340; additionally, in embodiments in which both wheels 1510 and 1520 are powered, electronics package 381 has an additional option of driving wheels 1510 and 1520 at different rotational rates, or even in different directions, as necessary for stability based upon current conditions and the inputs received by the on-board control unit.

In operation of vehicle 1500 at a variety of speeds, steering control (i.e., angle of deflection relative to longitudinal axis 360) and power settings for either or both of first wheel 1510 and second wheel 1520 may be coordinated with control of hinge assembly 340 as necessary or as may be determined to be most efficient. This may be determined, as noted above, as a function of inputs (such as from sensors 383) to electronics package 381 that are indicative of speed and inertia, and additionally as a function of the amplitude, rapidity, or relative urgency of steering inputs provided by an operator (such as via handlebars, a tiller, a steering wheel, or a joystick or other fly-by-wire input mechanism).

Figure 16:
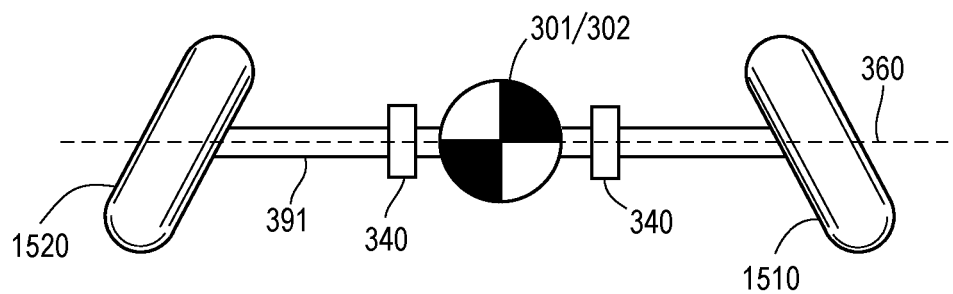
FIG. 16 is a simplified top view of the vehicle of FIG. 15 with the steerable wheels configured for a tight turn.
Figure 17:
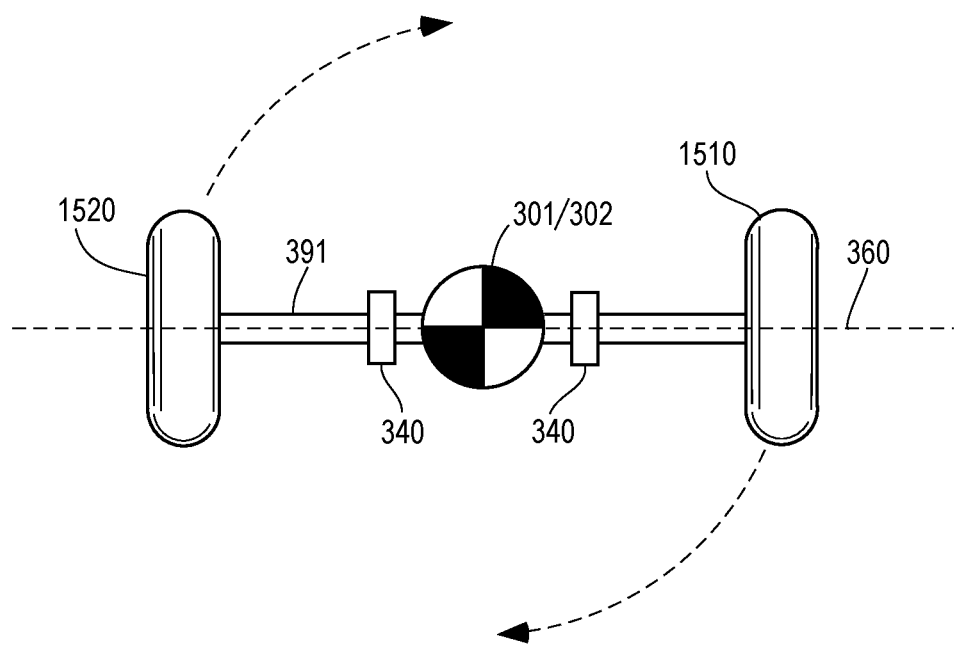
FIG. 17 is a simplified top view of the vehicle of FIG. 15 with the steerable wheels configured for a zero-radius turn.

FIG. 16 is a simplified top view of the vehicle of FIG. 15 with the steerable wheels configured for a tight turn, and FIG. 17 is a simplified top view of the vehicle of FIG. 15 with the steerable wheels configured for a zero-radius turn.

As noted above with reference to FIG. 15, at low to very low speeds, rear wheel 1520 may be controlled to deflect in the opposite direction as front wheel 1510. In computer-controlled or fly-by-wire systems in which wheels 1510 and 1520 are not physically coupled by mechanical components that predetermine one wheel's deflection in response to the other's, the degree to which front wheel 1510 and rear wheel 1520 are or may be deflected may be determined by an on-board control unit, such as electronics package 381 described above, as a function of the factors noted above in detail (speed, inertia, amplitude and rapidity of steering inputs, traction as determined by wheel slip, road conditions as determined by inertial sensors, etc.). The configuration of wheels 1510 and 1520 illustrated in FIG. 16 may allow for very tight radius low speed turns, as set forth above. It is noted that a similar configuration may be employed to facilitate high speed turns, though the deflection angles of each wheel 1510 and 1520 would likely be more acute than depicted in FIG. 16, depending upon speed, steering inputs, road conditions, and other factors. As an alternative, where rear wheel 1520 is controlled to deflect in the same direction as front wheel 1510, vehicle 1500 may be made to move on a trajectory that is angled from longitudinal axis (reference numeral 360 in FIG. 3), without changing an orientation of vehicle 1500 as set forth above.

Similarly, the configuration of wheels 1510 and 1520 illustrated in FIG. 17 may allow for zero-radius turns at forward speeds approaching zero. Specifically, wheels 1510 and 1520 may be deflected to approximately 90 degrees (i.e., perpendicular) relative to longitudinal axis 360, allowing vehicle 1500 to rotate about a vertical axis while wheels 1510 and 1520 describe an essentially circular path as illustrated. The aforementioned diagonal mode of motion may be effectuated as wheels 1510 and 1520 are deflected towards, but have yet to reach, the perpendicular orientation illustrated in FIG. 17.

As noted above, when wheels 1510 and 1520 are oriented as depicted in FIG. 17, sideways motion of vehicle 1500 is possible, in addition to the rotation illustrated by the dashed arrows. For instance, where both wheels 1510 and 1520 are powered and controlled such that the rotational direction of each wheel 1510 and 1520 about its respective axle is in the same direction (say, towards the top of the page in FIG. 17), then vehicle 1500 may be made to move sideways, towards the top of the page in this example.

It will be appreciated that the modes of motion described in connection with FIGS. 16 and 17 would not be possible in the context of a two-wheeled vehicle without the self-stabilization functionality described above with reference to FIGS. 1 through 14. Similarly, by incorporating the two-wheeled steering functionality into vehicle 1500, the self-stabilization functionality becomes easier to implement in practical applications. Specifically, because the on-board control unit has additional options for stabilization (such as deflecting one or both of wheels 1510 and 1520, or separately controlling their roll rates or directions), complete reliance upon hinge assembly 340 for self-stabilization is not necessary. Accordingly, in commercial embodiments employing two-wheeled steering functionality, hinge assembly 340 may be embodied in or comprise components or structures that may be less robust, ruggedized, or capable than may otherwise be required in the case where vehicle 300 is not equipped with two-wheeled steering; specifically, hinge assembly 340 may be made to be smaller, lighter, less powerful or less responsive, or otherwise cheaper than may be necessary if wheels 1510 and 1520 are not also controllable by electronics package 381. These cooperating technologies each support and enable implementation of the other.

Figure 18:
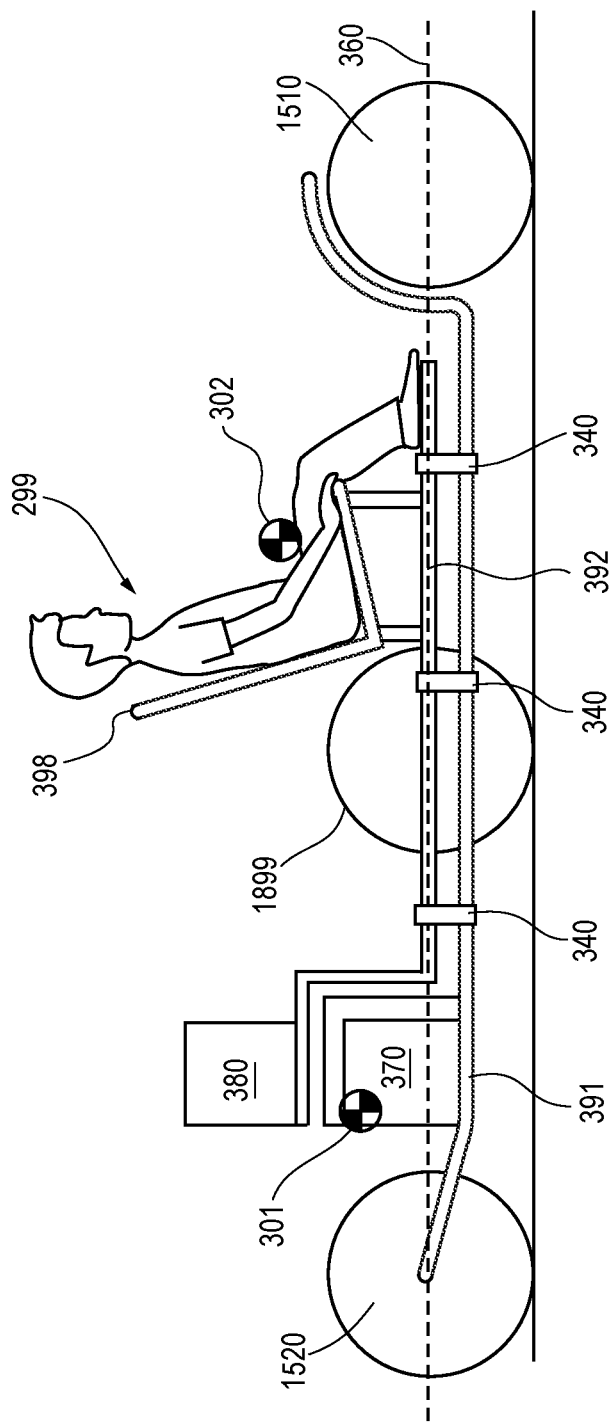
FIG. 18 is a simplified side view diagram illustrating one embodiment of a self-stabilizing inline vehicle having three wheels and illustrating a location of the centers of mass of different frame portions.

FIG. 18 is a simplified side view diagram illustrating one embodiment of a self-stabilizing inline vehicle having three wheels and illustrating a location of the centers of mass of different frame portions. In that regard, FIG. 18 illustrates similar features as those described above with specific reference to FIGS. 3 and 4, but further illustrates a third wheel 1899 disposed between, and approximately equidistant from, each of steerable wheels 1510 and 1520. In some implementations, third wheel 1899 may be made to be steerable, though the degree to which it may be deflected may be limited depending upon structural features of base frame portion 391, operator frame portion 392, shell 199, and other components. It is not necessary that third wheel 1899 be of the same, or even similar, diameter as steerable wheels 1510 and 1520.

It will be appreciated that the foregoing modes of motion may be implemented with the configuration illustrated in FIG. 18, and that even a moderately deflectable third wheel 1899 may increase stability. Additionally, where base frame portion 391 and operator frame portion 392 are articulated longitudinally at or near the location of third wheel 1899, then third wheel 1899 may provide appreciably increased stability and prevent lower portions of vehicle 1500 frame or other structures from striking the ground or road surface (i.e., "bottoming out") in areas of rapid or dramatic elevation change, such as at driveway aprons, parking structure ramps, or other uneven terrain.

Figure 19:
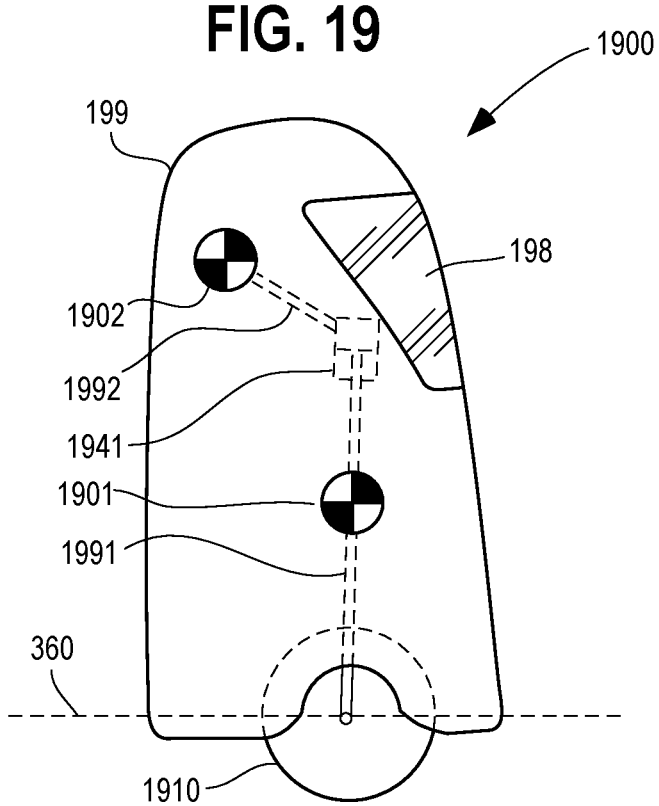
FIG. 19 is a simplified side view diagram illustrating one embodiment of a self-stabilizing vehicle having a single wheel and illustrating a location of the centers of mass of different frame portions.

FIG. 19 is a simplified side view diagram illustrating one embodiment of a self-stabilizing vehicle having a single wheel and illustrating a location of the centers of mass of different frame portions. In some respects, vehicle 1900 may be characterized as a self-powered, self-stabilizing, steerable, unicycle with an optional shell 199. If included, shell 199 may include a windscreen 198 or windshield, a door or other means of ingress and egress (not shown), and additional windows (not shown).

In this implementation, a self-stabilizing vehicle 1900 may generally comprise a single wheel 1910 (which may be steerable), a base frame portion 1991 that may be operably coupled to wheel 1910, an operator frame portion 1992 to support an operator, such as on a seat or other support structure (not shown), and a multi-axis hinge assembly 1941 operably coupling base frame portion 1991 and operator frame portion 1992. As with the depictions of other drawing figures above, certain structural and operational components, such as suspension linkages or supporting apparatus, drive trains, brakes, fluid and electrical conduits, structural support mechanisms, and the like, have been omitted from FIG. 19 for clarity. Additionally, power units (such as an engine or electric motor) and electronics (such as an on-board control unit as may be embodied in or comprise electronics assembly 380, electronics package 381, battery cells 382, sensors 383, and the like) have been omitted from FIG. 19; as these may be embodied in or comprise substantially the same physical and functional characteristics as those set forth above with reference to the other drawing figures, the detailed descriptions of these components and the various possibilities for implementation will not be repeated here.

In a departure from the multi-wheeled versions described above, multi-axis hinge assembly 1941 for a single-wheeled self-stabilizing vehicle 1900 may allow rotation about at least two hinge axes (as compared to hinge assembly 340 which has only one hinge axis). In one implementation, one hinge axis is substantially parallel to longitudinal axis 360, and one hinge axis is substantially perpendicular to longitudinal axis 360. In this situation, the former controls longitudinal roll of vehicle 1900, and the latter controls pitch (forward and backward tilt) of vehicle 1900; yaw (rotation about a vertical axis) may be controlled by steering control inputs provided to wheel 1910 in situations in which it is not only driven, but also steerable. Additionally or alternatively, multi-axis hinge assembly 1941 may allow rotation about three axes (i.e., include the vertical axis as an additional degree of freedom).

In that regard, it will be appreciated that, since vehicle 1900 has only one wheel 1910, the self-stabilizing functionality described herein may generally be more challenging in most situations than it otherwise would be in the case of a multi-wheeled vehicle 300 or 1500. For instance, pitch is not a variable which needs to be controlled in a tandem configuration such as illustrated above in connection with FIGS. 3 and 15, but it is important to control pitch in a single-wheel configuration as illustrated in FIG. 19. It is for this reason that multi-axis hinge assembly 1941 may be suitable for practical applications of vehicle 1900.

As with the implementations described above, multi-axis hinge assembly 1941 generally allows operator frame portion 1992 to rotate about one or more hinge axes relative to base frame portion 1991 to position, relative to a center of mass of base frame portion 1991 (and that which it supports, reference numeral 301), a center of mass of operator frame portion 1992 (and that which it supports, reference numeral 302) in such a manner as to maintain stability of vehicle 1900 during operation.

As was described above with reference to FIG. 4, the operator frame portion mass 1902 in FIG. 19 generally includes the respective masses of operator frame portion 1992 and (not shown in FIG. 19), at least: operator 299, seat 398, and electronics assembly 380 (including electronics package 381). Similarly, the base frame portion mass 1901 includes the respective masses of at least wheel 1910, base frame portion 1991, and motor assembly 370 (not shown in FIG. 19). The mass of multi-axis hinge assembly 1941 spans the boundary between these two masses 1901 and 1902, and contributes a fraction of its own mass to both.

In operation, vehicle 1900 and its constituent components function as set forth above in connection with the multi-wheeled embodiments described with reference to FIGS. 1 through 18, with a notable exception being that the multi-axis hinge assembly 1941 is capable of rotating operator frame portion 1992 about more than one axis simultaneously. Specifically, responsive to instantaneous speed and inertia data (e.g., acquired by sensors 383), steering control inputs (e.g., provided by operator 299 such as via a steering wheel, joystick, or other device), or a combination of these and perhaps other factors (such as wheel slip or traction loss indications, road conditions, incline or decline in roadways or driveways, etc.), electronics package 381 may drive multi-axis hinge assembly 1941 to move operator frame portion 1992 in such a manner as to stabilize vehicle 1900. In this case (as compared to vehicle 300 or vehicle 1500), electronics package 381 may drive multi-axis hinge assembly 1941 to rotate operator frame portion 1992 about at least two axes, and possibly three (particularly if wheel 1910 is not steerable and yaw control is effectuated via actuation of multi-axis hinge assembly 1941).

Figure 20:
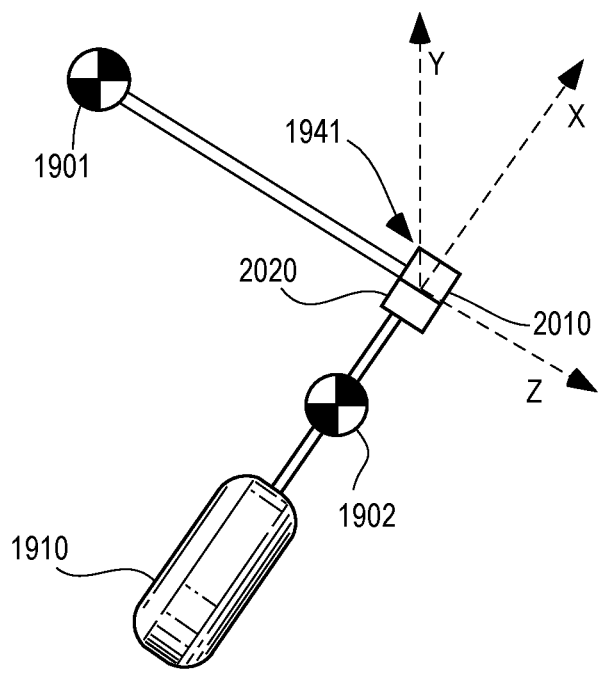
FIG. 20 is a simplified diagram illustrating details of a multi-axis hinge assembly for use in connection with a self-stabilizing vehicle.

In that regard, FIG. 20 is a simplified diagram illustrating details of a multi-axis hinge assembly for use in connection with a self-stabilizing vehicle. As depicted in FIG. 20, a multi-axis hinge assembly 1941 may generally comprise a first hinge 2010 having a first hinge axis and a second hinge 2020 having a second hinge axis that is substantially perpendicular to the first hinge axis. Some implementations may include a third hinge (not shown) having a third hinge axis that is substantially perpendicular to both of the first hinge axis and the second hinge axis.

By way of example, each of first hinge 2010 and second hinge 2020 may be constructed and operative as set forth above with reference to FIG. 7, which describes structure and functional characteristics of a single-axis hinge assembly 340. The FIG. 20 configuration generally represents a situation in which two of the single-axis hinge assemblies 340 described in FIG. 7 are oriented at 90 degrees to each other and integrated into a single multi-axis hinge assembly 1941. A third single-axis hinge assembly 340 may be incorporated as well, such that multi-axis hinge assembly 1941 may also control yaw; additionally or alternatively, operator frame portion 1992 may be coupled to base frame portion 1991 via a powered, pivotable connection, for example, or wheel 1910 may be made steerable as set forth above, to allow electronics package to control yaw about the vertical axis.

Actuator arms, pivoting connections, and other structures for driving multi-axis hinge 1941 have been omitted from FIG. 20 for clarity. Those of skill in the art will appreciate that multi-axis hinge 1941 may take many forms. For example, as opposed to the configuration illustrated in FIG.

20, multi-axis hinge may generally be embodied in or comprise ball and socket joint hardware, gimbals, and other suitable pivotable connections that allow rotation of one structure relative to another. Whether implemented individually or in combination, as long as the structures, movable components, and operative driving elements employed in multi-axis hinge assembly 1941 enable the rotation described herein and may be selectively driven under control of electronics package 381, the present disclosure is not intended to be limited by the type, nature, and operational characteristics of individual components used in multi-axis hinge 1941.

Several features and aspects of a system and method have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the present disclosure be considered as limited only by the scope of the appended claims.

What is claimed is:

1. A self-stabilizing vehicle comprising:
    a front wheel and a rear wheel substantially aligned along a longitudinal axis;
    a base frame portion coupled to the front wheel and to the rear wheel;
    an operator frame portion to support an operator of the vehicle;
    a hinge assembly operably coupling the base frame portion and the operator frame portion; and
    a control unit receiving, from an inertial sensor, inertial data related to deviation of the base frame portion from a vertical plane through the longitudinal axis, receiving, from a speed sensor, instantaneous speed data related to a rate of travel of the vehicle, and receiving, from a steering control input mechanism, a steering control input signal related to an intended direction of travel;
    wherein the control unit is operative to drive the hinge assembly causing the operator frame portion to rotate about a hinge axis as a function of the inertial data and the instantaneous speed data;
    wherein the control unit is further operative to cause each of the front wheel and the rear wheel to deflect, independently, at a respective angle from the longitudinal axis as a function of the steering control input to direct the vehicle in the intended direction of travel; and
    wherein the control unit is further operative to vary the deflection angle of at least one of the front wheel and the rear wheel, from the longitudinal axis, additionally as a function of the inertial data and the instantaneous speed data, in combination with the driving of the hinge assembly, to stabilize the vehicle.

2. The vehicle of claim 1 wherein the hinge axis is substantially parallel to the longitudinal axis.

3. The vehicle of claim 1 wherein the hinge axis is substantially normal to the longitudinal axis.

4. The vehicle of claim 1 wherein the hinge assembly includes an actuator controlling an angle of a hinge.

5. The vehicle of claim 4 wherein the control unit computes an angle through which to rotate the operator frame portion and a torque to apply to the hinge assembly.

6. The vehicle of claim 5 wherein the control unit computes an angle through which to rotate the operator frame portion and a torque to apply to the hinge as a function of the steering control input.

7. The vehicle of claim 1 wherein the control unit causes each of the front wheel and the rear wheel to deflect from the longitudinal axis in opposite directions.

8. The vehicle of claim 1 wherein the control unit causes each of the front wheel and the rear wheel to deflect from the longitudinal axis in a same direction.

9. The vehicle of claim 8 wherein the control unit causes each of the front wheel and the rear wheel to deflect to a position that is substantially perpendicular to the longitudinal axis.

10. A method of stabilizing a vehicle, the method comprising:
    coupling a base frame portion of the vehicle to a front wheel and to a rear wheel, wherein the front wheel and the rear wheel are substantially aligned along a longitudinal axis;
    coupling the base frame portion to an operator frame portion with a hinge having a hinge axis, wherein the operator frame portion is to support an operator of the vehicle and is selectively rotatable relative to the base frame portion about the hinge axis;
    receiving, from an inertial sensor, inertial data related to deviation of the base frame portion from a vertical plane through the longitudinal axis and receiving, from a speed sensor, instantaneous speed data related to a rate of travel of the vehicle;
    receiving, from a steering control input mechanism, a steering control input signal related to an intended direction of travel;
    responsive to the inertial data and the instantaneous speed data, selectively driving the hinge to cause the operator frame portion to rotate about the hinge axis;
    responsive to the steering control input signal, selectively causing each of the front wheel and the rear wheel to deflect at a respective angle from the longitudinal axis to direct the vehicle in the intended direction of travel; and
    varying the deflection angle of at least one of the front wheel and the rear wheel, from the longitudinal axis, additionally as a function of the inertial data and the instantaneous speed data, in combination with the driving of the hinge assembly, to stabilize the vehicle.

11. The method of claim 10 wherein the receiving inertial data comprises utilizing a control unit to receive data from a gyroscope.

12. The method of claim 10 wherein the receiving instantaneous speed data comprises utilizing a control unit to receive data from a speedometer.

13. The method of claim 10 wherein the receiving the steering control input signal comprises utilizing a control unit to receive a signal from one of a steering wheel, a handle controller, or a joystick.

14. The method of claim 10 further comprising utilizing a control unit to compute, using the inertial data and the instantaneous speed data, an angle through which to rotate the operator frame portion and a torque to apply to the hinge.

15. The method of claim 14 wherein the selectively driving the hinge further comprises computing the angle and the torque as a function of the steering control input signal.

16. The method of claim 14 wherein the selectively causing further comprises utilizing the control unit to compute the respective angle for each of the front wheel and the rear wheel as a function of the steering control input signal, the inertial data, and the instantaneous speed data.

17. The method of claim 16 wherein the selectively causing further comprises causing each of the front wheel and the rear wheel to deflect from the longitudinal axis in opposite directions.

18. The method of claim 16 wherein the selectively causing further comprises causing each of the front wheel and the rear wheel to deflect from the longitudinal axis in a same direction.

* * * * *